United States Patent
Laney et al.

(10) Patent No.: US 7,189,299 B2
(45) Date of Patent: Mar. 13, 2007

(54) THERMAL-DYE-TRANSFER LABEL CAPABLE OF REPRODUCING FLESH TONES

(75) Inventors: Thomas M. Laney, Spencerport, NY (US); Eric E. Arrington, Canandaigua, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 262 days.

(21) Appl. No.: 10/602,839

(22) Filed: Jun. 24, 2003

(65) Prior Publication Data

US 2004/0261936 A1    Dec. 30, 2004

(51) Int. Cl.
*B32B 31/18*    (2006.01)
(52) U.S. Cl. ............ 156/243; 156/244.11; 156/244.23
(58) Field of Classification Search ........... 156/244.11, 156/229, 230, 242, 243, 244.23, 257, 267, 156/268, 270, 2; 428/213, 214, 215, 216, 428/202
See application file for complete search history.

(56) References Cited

U.S. PATENT DOCUMENTS

| | | | |
|---|---|---|---|
| 4,984,823 A | | 1/1991 | Ishii et al. |
| 5,288,548 A | * | 2/1994 | Weber ...................... 428/315.9 |
| 5,372,669 A | * | 12/1994 | Freedman .................... 156/243 |
| 5,399,218 A | | 3/1995 | Harrison et al. |
| 6,153,558 A | | 11/2000 | Shirai et al. |
| 6,162,517 A | | 12/2000 | Oshima et al. |
| 6,210,767 B1 | * | 4/2001 | Knauf ........................ 428/40.1 |

* cited by examiner

*Primary Examiner*—George Koch
(74) *Attorney, Agent, or Firm*—Chris P. Konkol; Kathleen Neuner Manne

(57) ABSTRACT

Processes for making a pragmatic label, a receiver sheet for making such a pragmatic label, and intermediates thereof are described. The receiver sheet comprises a pragmatic pre-label sheet, a lower strippable carrier, a pressure-sensitive adhesive layer between said lower strippable carrier and the pragmatic pre-label sheet. The pragmatic pre-label sheet is made by coextruding a first melt for a polymeric image-receiving layer with one or more other melts for forming a single-layer or multiple-layer pragmatic polymer sheet, wherein said other melts includes a second melt comprising an orientable thermoplastic polymeric material for forming a microvoided layer, said coextruded melts forming a multilayer composite film that is subsequently subjected to stretching. The pragmatic labels and receiver sheets of the present invention can advantageously be made without the use of solvent coating.

44 Claims, No Drawings

THERMAL-DYE-TRANSFER LABEL CAPABLE OF REPRODUCING FLESH TONES

FIELD OF THE INVENTION

The invention relates to a high-quality pressure-sensitive label for application to packages.

BACKGROUND OF THE INVENTION

Pressure-sensitive labels are applied to packages to build brand awareness, show the contents of the package, convey a quality message regarding the contents of a package, and supply consumer information such as directions on product use, or an ingredient listing of the contents. Printing on the pressure-sensitive label is typically done using gravure printing or flexography. There is a continuing need to improve the visual appeal of labels to increase shelf awareness of products. Prior-art printed labels have attempted to provide improved visual information on labels by utilizing multiple print stations in a printing press to achieve "photographic quality". While nine color presses do provide a good image, thermal-dye-transfer images provide depth, excellent flesh tone replication, excellent tone scale and superior image sharpness.

Prior-art labels that are applied to packages consist of a base, a pressure-sensitive adhesive, and a liner (carrier). The label substrate consisting of the base material, pressure-sensitive adhesive and liner are typically laminated and then printed utilizing a variety of printing methods. After printing, the labels are often protected by an over-laminate material or a protective coating. The completed label consisting of a protection layer, printed information such as an image, base, pressure-sensitive adhesive is applied to packages utilizing high-speed labeling equipment.

One method of printing labels is flexography which is an offset letterpress technique where the printing plates are made from rubber or photopolymers. The printing on pressure sensitive labels is accomplished by the transfer of ink from the raised surface of the printing plate to the surface of the material being printed. The rotogravure method of printing uses a print cylinder with thousands of tiny cells that are below the surface of the printing cylinder. The ink is transferred from the cells when the print cylinder is brought into contact with the pressure-sensitive label at the impression roll. Printing inks for flexography or rotogravure include solvent-based inks, water-based inks and radiation-cured inks. While rotogravure and flexography printing do provide acceptable image quality, these two printing methods require expensive and time consuming preparation of print cylinders or printing plates which make printing jobs of less than 100,000 units expensive as the set-up cost and the cost of the cylinders or printing plates is typically depreciated over the size of the print job.

Recently, digital printing has become a viable method for the printing of information on packages. The term digital printing refers to the electronic digital characters or electronic digital images that can be printed by an electronic output device capable of translating digital information. The main digital printing technologies are inkjet, electrophotography, and thermal dye transfer.

Digital inkjet printing has the potential to revolutionize the printing industry by making short-run color-print jobs more economical. However, the next commercial stage will require significant improvements in ink jet technology; the major hurdle remaining is to improve print speed. Part of this problem is the limitation of the amount of data the printer can handle rapidly. The more complex the design, the slower the printing process. Right now they are about 10 times slower than comparable digital electrostatic printers.

Another printing technique for labels is disclosed in U.S. Ser. No. 10/027,971 to Bourdelais et al. and involves silver-halide photography. Such printing on labels can provide higher quality images to packaging materials, including the printing of images using an optical digital printing system with the Pantone color space of printed inks.

In recent years, thermal transfer systems have been developed to obtain prints from pictures that have been generated electronically. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. A color hard copy is thus obtained which corresponds to the original picture viewed on a screen. Further details of this process and an apparatus for carrying it out are set forth in U.S. Pat. No. 4,621,271.

Dye-receiving elements used in thermal dye transfer generally comprise a polymeric dye image-receiving layer coated on a support. Supports are required to have, among other properties, adequate strength, dimensional stability, and heat resistance. For reflective viewing, supports are also desired to be as white as possible. Cellulose paper and plastic films have been proposed for use as dye-receiving element supports in efforts to meet these requirements. Recently, microvoided films formed by stretching an orientable polymer containing an incompatible organic or inorganic material have been suggested for use in dye-receiving elements.

Typically pressure sensitive labels are printed with printing inks. Printing inks, while providing good text and graphic quality, can not match the quality of a thermal dye transfer image.

CITE Prior Art on TDT Labels.

Thermal transfer image receiving sheets for labels or stickers are known in the art including, for example, U.S. Pat. Nos. 6,153,558; 6,162,517; and 4,984,823. U.S. Pat. No. 6,162,517 to Oshima et al., for example, discloses a label comprising, disposed between a dye receptor layer and an adhesive layer, a foamed resin film layer and a non-foamed resin film layer. A bonding layer can be disposed between the foamed and non-foamed layers. U.S. Pat. No. 4,984,823 to Ishii et al. discloses, a label portion comprising an image-receiving layer, a sheet substrate, and an adhesive layer. The sheet substrate can be a resin film such as foamed polyethylene terephthalate, synthetic paper, and the like.

There is a continuing need for high-quality labels that can be printed from digital label files that contain graphics, text and images. Digital printing of labels takes advantage of the growing amount of label data that is resident in digital files. Digital printing, as opposed to the analog flexographic printing of labels, also enables the use of distributive printing of label files. Distributive printing allows a digital label file to be created in one central location, sent to remote locations, and printed on digital label printers.

PROBLEM TO BE SOLVED BY THE INVENTION

In particular, there is a need for pressure-sensitive labels for application to packages that are high in quality and at the same time economical for short runs. There is a further need for the printing of the labels from digital information files that has a photographic-quality image.

Another problem with prior-art labels is that they are difficult to manufacture and require the use of solvent coatings. It would be desirable to significantly improve and simplify the manufacture of high-quality labels.

SUMMARY OF THE INVENTION

It is an object of the invention to provide higher quality images to packaging materials.

It is a further object to provide a thermal-dye-transfer imaging system for making labels that have bright and sharp images.

It is another object to provide imaging on labels that involves a cleaner process, not necessitating solvents, process solutions, or solvent-based inks.

It is a further object of the invention to provide labels that can be printed from digital files.

It is a further object of the invention to provide labels that are more amenable to the printing, if desired, of smaller runs (or lengths of labels continuously printed at one time, for example, less than 50 meters), relative to lithographic printing.

These and other objects of the invention are accomplished by a process of making a thermal-dye-transfer labels comprising a pragmatic polymer sheet (which is not part of the carrier) and, above the pragmatic polymer sheet, at least one layer capable of receiving or having received an image, which image comprises dyes and, below the pragmatic polymer sheet, a lower strippable (i.e. peelable) carrier, a pressure sensitive adhesive layer between said lower strippable carrier and said pragmatic polymer sheet, and optionally an environmental protection layer overlaying the imaging layer. Preferably, the carrier comprises paper and has exposed edges where it has a greater surface area than the pragmatic sheet and said image optionally further comprises fiducial marks. Optionally, an intermediate sheet can be located between the pragmatic polymer sheet and the adhesive layer.

In the labels made in the present invention, a "pragmatic label" or "face stock" comprises, from top to bottom, an image-receiving layer (typically imaged), a substrate, and an adhesive layer, but does not include the removable carrier sheet from which it is separated before adhesively applying the pragmatic label to an objective body. A "pragmatic label" can be applied to the surface of an objective body such as a package, container, wall, card, vehicle, or any other object that comprises a generally smooth solid surface.

As used herein, the "substrate" of a pragmatic label, which substrate can comprise one or more layers, refers to the part of the label between the image receiving layer and the pressure-sensitive adhesive layer. Since, as indicated below, the pragmatic label may comprise more than one adhesive layers, the latter adhesive layer will be referred to as the "bottom adhesive layer."

The "substrate" can comprise one or more layers, including a pragmatic polymer sheet. The pragmatic polymer sheet is immediately under the image-receiving layer and comprises a microvoided layer and any other coextruded layers other than the image-receiving layer. The pragmatic polymer sheet is coextruded with the image-receiving layer.

Typically one or more "pragmatic labels" or "label face stocks," are cut into an imaged or unimaged "pragmatic pre-label sheet" that is adhesively attached to a carrier sheet, both pragmatic pre-label sheet and carrier sheet forming an "integral-separable pre-label receiver sheet" or "pre-label receiver sheet." The one or more pragmatic labels cut in the pre-label receiver sheet (typically only the pragmatic pre-label sheet), which labels can be cut into various shapes, from what is then referred to as a "pragmatic-label sheet," the bottom surface of which, like the pre-label receiver sheet before it, remains adhesively attached to the top surface of a common carrier-sheet or to the top surface of a separate carrier sheet, as the case may be, depending on the cutting operation. Each pragmatic label in a pragmatic-label sheet can be separated from the carrier sheet before applying it to decorate or otherwise label an object.

Typically, the pragmatic labels are cut from an imaged pre-label receiver sheet to form an imaged pragmatic-label sheet, although it is possible to cut the pragmatic labels in the sheet prior to imaging.

Once a pragmatic label is formed in a pre-label sheet, the pre-label sheet is then referred to as a "integral-separable label sheet" or "label sheet" comprising a pragmatic label sheet and a carrier sheet. Thus, a label sheet is an assembly that includes at least one pragmatic label (also referred to as a pragmatic label portion when part of a sheet) and at least one carrier sheet adhesively but separably attached to the bottom adhesive layer of the pragmatic label. The pragmatic label, in a label sheet, is thus integral with a separable or peelable carrier sheet. As indicated above, the pragmatic label is usually imaged in the label sheet but it is also possible to image the label at a later time.

Usually, the label sheet when completely constructed comprises more than a single pragmatic label which may be in frames as in U.S. Pat. No. 4,984,823, hereby incorporated by references, or the label sheet may have any other arrangement advantageous to the particular circumstances of use. In the case of a single pragmatic label, the label sheet may also be referred to as a "single-label assembly.

In one embodiment of the invention, a pragmatic label is cut into a "pre-label sheet" that is already imaged. The pre-label sheet usually remains integral during imaging, although it is possible to image the pragmatic label prior to joining it to a carrier sheet or after removing it from the carrier sheet. In another embodiment, a pragmatic label is cut into an unimaged pre-label sheet that is later imaged.

The term "label" as used herein usually refers to a pragmatic label, either as part of a pragmatic label sheet, alone, or during use after being applied to an object, unless otherwise indicated by the context.

The term "untackified pragmatic label" refers to the pragmatic label excluding only the adhesive layer on the bottom side of the pragmatic label. Similarly, the "untackified pragmatic label sheet" or "untackified pragmatic pre-label sheet will refer to pragmatic label or pre-label sheet excluding only the bottom adhesive layer.

The terms "carrier," "peelable carrier," "carrier sheet," "liner," "carrier stock" of the like refers to the part of the label assembly element separable from the face stock, which is under the bottom adhesive layer. As indicated above, the carrier can be designed to hold a single pragmatic label or be common to a plurality of pragmatic labels.

In a typical embodiment, therefore, the label sheet is dividable into two parts or "sides," an "upper side," consisting of the pragmatic-label sheet or face stock sheet, and a "lower side" consisting of the carrier sheet, which two sides are typically divided after imaging and before applying the pragmatic label to an objective body, although it is also possible for an untackified pragmatic label to be printed or imaged before it is joined to the carrier sheet.

The carrier can comprise a multilayer sheet, including a release layer adjacent the adhesive layer of the upper side. As indicated below, the bottom adhesive layer of the pragmatic label sheet or pragmatic pre-label sheet can be applied to the rest of the sheet in various ways. For example, the adhesive layer can be coated onto the bottom of an untackified pre-label sheet, it can be coated on the bottom of a laminate that is applied to the rest of the pragmatic pre-label sheet, or it can be coated on top of a laminate forming a portion or the whole of the peelable carrier which is then applied to the pragmatic pre-label sheet.

The terms "top", "upper", "and "face" of the label, label sheet, or precursor therefore, mean the side or towards the side of a label or label sheet or related structure bearing the imaging layer. The terms "bottom", "lower side", "liner" and "back" mean the side or towards the side of the label or label sheet or related structure, or precursor thereof, opposite from the side bearing the image. The term "environmental protection layer" or "protective overcoat" means a substantially transparent layer applied over the fully imaged dye-receiving layer on a label or label sheet.

ADVANTAGEOUS EFFECT OF THE INVENTION

The invention provides an improved process of making labels having improved image quality, including more realistic flesh tones, for packaging materials. The invention includes a printing method that can print text, graphic and images using optical digital printing systems in combination with a pressure-sensitive label for packaging. The labels made according to the invention comprises a coextruded image receiving layer. In one preferred embodiment, the entire face stock, except for the bottom adhesive layer, is coextruded.

DETAILED DESCRIPTION OF THE INVENTION

A pragmatic label according to the invention comprises, in order, a polymeric image-receiving layer, a pragmatic polymer sheet, and an adhesive layer. Such a label is typically manufactured as part of an integral-separable label sheet, comprising a pragmatic label sheet and a carrier sheet. The pragmatic-label sheet can be made by the following steps. First, a first melt for a polymeric image receiving layer is coextruded with one or more other melts for forming a single-layer or multiple-layer "pragmatic polymer sheet," wherein the other melts includes at least a second melt comprising an orientable thermoplastic polymeric material for forming a microvoided layer and a void initiator such as crosslinked polymeric microbeads, thereby forming a cast composite film comprising at least two layers, the image-receiving layer and the microvoided layer.

Second, the cast composite film is stretched in at least one direction to reduce the thickness of the layers in the composite film and to produce an oriented composite film, wherein the image receiving layer is less than 15 micrometers and the thick, preferably 1 to 5 µm. Third, an optional intermediate sheet, comprising one or more layers, is optionally applied to the back surface of the stretched composite film. The intermediate sheet, for example, can be non-voided polyester such as poly(ethylene terephthalate) to provide further support to the pragmatic label during use. Other polymers, however, including polyolefins, can be used which, however, may require a subbing layer for laminating it to the pragmatic polymer sheet.

Third, a pressure-sensitive adhesive layer, or a laminate comprising a pressure-sensitive adhesive layer, is applied to at least a portion of the back surface side, preferably the entire side, of the stretched composite film, on the side opposite the image-receiving layer, to form a pre-label receiver sheet or, when an intermediate sheet is present, to at least a portion of the back surface of the intermediate sheet. In one embodiment, the adhesive is applied to the back of the stretched composite film. This material can be referred to as a "pragmatic pre-label sheet."

This so-called "pragmatic pre-label sheet" can then be provided with a carrier sheet such that the adhesive layer of the pre-label receiver sheet is covered with the carrier sheet in peelable adhesion, thereby forming an integral-separable "pre-label receiver sheet." Subsequently, at least one shape can be cut into at least the pragmatic pre-label sheet of the pre-label receiver sheet, before or after imaging of the receiver sheet, to form at least one pragmatic label in the sheet, thereby forming an integral-separable label sheet comprising a pragmatic-label sheet attached to a carrier sheet.

In one embodiment, when the carrier sheet is laminated to the pragmatic pre-label sheet, a front surface of the carrier sheet faces the back surface of the pragmatic pre-label sheet. Preferably, at least one pragmatic-label portion is formed in the pragmatic-label sheet by cuttingly a shape through the pragmatic pre-label sheet but not through the carrier sheet.

In a preferred embodiment, the pre-label receiver sheet is made by co-extruding a first melt for a polymeric image receiving layer with one or more other melts for forming a single-layer or multiple-layer pragmatic polymer sheet, wherein the other melts includes a second melt comprising a continuous phase polymer matrix having dispersed therein crosslinked organic microbeads optionally with non-crosslinked organic polymer particles, and a third melt comprising a voided or non-voided thermoplastic material, thereby forming a cast composite film comprising at least said three layers, followed by stretching in at least one direction the cast composite film to reduce the thickness of the layers in the composite film and to produce an oriented composite film. The composite film comprises as the first layer an image-receiving layer, as the second layer a microvoided compliant layer, and as a third layer a microvoided or non-voided underlayer.

In a particularly preferred embodiment, the microvoided layer comprises a polyester material; preferably the microvoided layer and the image-receiving layer both comprise a polyester material.

In an especially preferred embodiment, the pragmatic pre-label sheet consists essentially of only coextruded layers above the pressure-sensitive adhesive layer; in other words, the image-receiving layer and the pragmatic polymer sheet provide the only layers in the untackified pragmatic label or untackified pragmatic pre-label sheet.

The peelable carrier can be laminated over the pressure-sensitive adhesive. (The terms peelable, removable, and strippable are herein used synonymously and interchangeably to indicate that the carrier is designed to be easily and readily separated from the label to which it is attached.)

Alternately, the pressure-sensitive adhesive layer can be coated onto a peelable carrier to form a pressure-sensitive adhesive transfer sheet, wherein the transfer sheet is laminated to the back side of the stretched composite film such that the adhesive and carrier are applied simultaneously to the pre-label receiver sheet. The carrier sheet, however, can comprise more than one layer and the layers of the carrier sheet are applied to the pre-label receiver sheet in more than one step.

In one embodiment, cutting lines are be formed at least partially through the integral-separable label sheet, so to allow peeling of at least one pragmatic label portion comprising a portioned (a) imaged image-receiving layer, (b) substrate, and (c) bottom pressure-sensitive adhesive layer, wherein the substrate consists of all the layers, including the portioned (i) pragmatic polymer and (ii) optional intermediate sheet, between the image-receiving layer and the bottom pressure-sensitive layer. In another embodiment, the integral-separable label sheet comprises a multiple number of pragmatic-label portions, and cutting lines are formed through the pragmatic-label portions but not through the carrier sheet. As indicated above, the multiple pragmatic-label portions in the sheet can be formed by sectioning the sheet into a plurality of contiguous frames each forming a separable pragmatic label. Alternatively, the pragmatic-label portions can be formed into isolated imaged areas.

During imaging of the pre-label receiver sheet, at least one dye image, optionally a plurality of dye-images, are formed on the image-receiving layer. A sublimation transferred image can be formed in said receiving layer by transferring a sublimable dye from a colorant layer of a heat transfer sheet, also referred to as a dye-donor element. Preferably, the print density of the image is at least 1.5, more preferably at least 2.0.

One advantage of the present invention is that an integral-separable pre-label sheet is produced comprising, in order, (a) an image-receiving layer, (b) a pragmatic polymer sheet comprising an oriented, stretched thermoplastic polymeric microvoided layer comprising a void initiator such as crosslinked organic microbeads, (c) a bottom pressure-sensitive adhesive layer, and (d) a peelable carrier, wherein as a result of its process of manufacture, such a sheet is characterized by there being no residual solvent in the image-receiving layer consistent with melt coextrusion of layers (a) and (b).

The invention is also directed to an integral-separable label sheet comprising at least one imaged or unimaged pragmatic-label portion. Finally, the present invention is also directed to an imaged or unimaged pragmatic label, before or after being separated from a carrier or label sheet and before or after being adhesively applied to an object.

One embodiment of the invention is directed to an integral-separable pre-label sheet that can be used to form an image on both sides of a label. In particular, such a two-sided integral-separable pre-label sheet comprises, in order, (a) a first imaged image-receiving layer, (b) a pragmatic polymer sheet comprising an oriented, stretched thermoplastic polymeric microvoided layer comprising crosslinked organic microbeads, (c) a second imaged image-receiving sheet, (c) a bottom pressure-sensitive adhesive layer, and (d) a peelable carrier. Again, such a sheet is characterized by there being no residual solvent in the image-receiving layer consistent with melt coextrusion of layers (a) and (b).

The invention has numerous advantages over prior practices in the art. Recently there has been a trend in the marketing of mass consumer items to try to localize the marketing to separately approach smaller groups. These groups may be regional, ethnic, gender, age, or special interest differentiated. In order to approach these different groups, there is a need to provide packaging that is specifically directed to these groups. As discussed above, the traditional packaging materials are generally suited for very long runs of material and to form shorter runs or to provide rapid changes in packaging is impossible or very expensive. By means of the present invention, thermal dye transfer materials are rendered more suitable for packaging uses. Further, recently there has become available rapid thermal dye transfer apparatus suitable for short runs of material. The combination of a low cost label material with the processing apparatus available for rapid short and long runs of material has resulted in an increased opportunity for thermal dye transfer material to be utilized as labels in packaging materials. In accordance with the present process, low-cost thermal dye transfer labels can be made that have excellent properties for packaging including high-quality imaging and the ability to print from a digital file.

The labels made by the present process are also capable of having brighter, sharper, and higher color images, than anything presently available in packaging by prior-art printing techniques. Thermal dye transfer imaging can provide superior flesh tones. The labels have the advantage of superior image are available on thin base materials which are low in cost while providing superior opacity and strength. Furthermore, the invention allows packages to be rapidly designed and brought to market. For instance, significant events in sports or entertainment may be brought to market, almost instantly, as a digital image. The digital image may be immediately printed onto pressure sensitive labels and utilized within moments from the time of the event. This is in contrast to typical photogravure or flexographic imaging where lead times for pressure-sensitive labels are typically several weeks. Further, the quality of the formed image lends itself to collectable images formed as a part of packaging much better than previous images which were of lower quality and were less desirable for collecting. Finally, the regional customization of images is rapidly possible.

The ability to rapidly change packaging also would find use in the need to provide regional labeling with different languages and marketing themes in different countries. Different countries have different legal labeling requirements as to content. For instance, alcoholic beverages such as wine and beer are subject to a wide variety of regional and national variations in labeling requirements. Wines manufactured in France may have long delays in shipping out of France due to the wait for national labeling in other countries. Photographic-quality images also would be particularly desirable for premium products such as fine wines, perfumes, and chocolates, as they would be of high quality and reflect the high quality of the product in the package. The invention provides a printing method that is economically viable when printing short runs as the cost of printing plates or printing cylinders are reduced.

Thermal dye transfer image technology can simultaneously print text, graphics, and photographic quality images on the pressure sensitive label. Since the thermal dye transfer imaging of the invention are both optically and digitally compatible, text, graphics, and images can be printed using known digital printing equipment such as lasers and CRT printers. Because the thermal dye transfer system is digitally compatible, each package can contain different data enabling customization of individual packages without the extra expense of printing plates or cylinders. Further, printing digital files allows the files to be transported using electronic data transfer technology such as the internet thus reducing the cycle time to apply printing to a package. Thermal dye transfer imaging allows competitive printing speeds compared to current ink jet. These and other advantages will be apparent from the detailed description below.

In the field of product labeling and advertising, the ability of the printing technology to reproduce all of the colors in the Pantone color space is important. An example is the reproduction of corporate colors such as candy apple reds or lemon yellows that uniquely identify a product. Prior art printed ink system for labeling have utilized spot colors beyond red, green and blue inks to obtain the desired color. Thermal dye transfer printing systems are typically Pantone color space limited when the thermal dye transfer uses only combinations of yellow, magenta and cyan dyes to form colors. (Thermal printing has the advantage that additional color patches, including white or fluorescent colors can be used to improve the color space.) At present, approximately 70% of Patone color space can be replicated with a yellow, magenta and cyan dye based system. As another option, additional color may be applied to the printed, developed thermal dye transfer formed image or additional color may be under the dye receiving layer, so that the image can comprise areas of both dye transfer image and areas colored, as background, without thermal dye transfer (uncovered by thermal dye transfer dyes) in order to improve the gamut of the image.

Thus, one preferred method of providing an expanded thermal dye transfer dye gamut is providing a non-neutral color to a layer under the dye-receiving layer, which non-neutral color will show through the transparent dye-receiving layer. By providing non-neutral, or a colored background to or near the top of the substrate of the label, a single color background can be utilized under the thermal dye transfer image of the invention. Further, because the dyes utilized in thermal dye transfer imaging printing systems are semi-transparent, background color can optionally be blended with color formed by thermal dye transfer dyes. An example of a colored background would be the addition of a candy apple red tint to a top layer of the substrate, adjacent the dye receiving layer, preferably in or near the top of the pragmatic polymer sheet. By forming a thermal dye transfer image on top of the candy apple red base, the dye gamut of the thermal dye transfer "system" is expanded to include candy apple red. The background color becomes part of the image by not applying the thermal dye transfer dye in certain intended or preselected areas and the background color can be eliminated by applying preselected one or more thermal dye transfer imaging dyes over the background.

Another preferred method for the expansion of the thermal dye transfer color space is by printing and developing the thermal dye transfer image and subsequently printing color on top of the thermal dye transfer formed image. This method is preferred as printing inks common to the printing industry can be used to expand the color gamut of the thermal dye transfer formed image. Over printing with dye based ink allow color formation with the thermal dye transfer formed dyes thus expanding the color space of the thermal dye transfer dyes. Over printing with pigmented inks, create expanded color without utilizing the native colors of the thermal dye transfer formed image below the pigment printing ink. Overprinting can occur by lithographic, inkjet, or other printing technologies.

In another embodiment, the base material preferably is printed with indicia. By printing the base material with indicia, the text size limitation of thermal dye transfer is overcome as printed text is legible to 2 points. Further, by printing black text on the base material, the thermal dye transfer imaging system utilized for printing can be low contrast which significantly improves flesh tones. Improved flesh tones, especially on advertising labels has significant commercial value as flesh tones comprising printed inks, characteristic of lithographic printing, are low in quality.

The addition of a fiducial mark to the thermal dye transfer formed image is preferred as the fiducial mark provides a means for die cutting the image to create a label. The addition of a fiducial mark allows the article to be die cut using optical sensors to read the registration of the image. The fiducial mark may be printed on the base material, printed using thermal dye transfer formed images or post process printed using printed inks. In another embodiment, the fiducial mark is created utilizing a mechanical means such as punched hole, mechanical embossing or a partial punched hole to create a topographical difference in the thermal dye transferred formed image. A mechanical fiducial mark allows for mechanical sensors to be used for die cutting, application of a spot printed color or for locating a label on a package during a automated labeling.

In another embodiment of the invention, the thermal dye transfer formed image is preferably over laminated with a pre-printed sheet. By pre-printing an over-lamination sheet with images, text or non-neutral color, the color space of the thermal dye transfer formed image is expanded. Further, over laminating can also protects the delicate thermal dye transfer formed image from abrasion, water and handling damage that frequently occurs for packaging labels.

Suitable printing inks for this invention to expand the color gamut of a thermal dye transfer system include solvent based inks and radiation cured inks. Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of radiation cured inks include ultraviolet and electron beam inks. The preferred ink systems for printing indicia are radiation cured inks because of the need to reduce volatile organic compounds associated with solvent based ink systems.

In order to produce a pressure sensitive label with expanded color gamut, the liner material that carries the pressure sensitive adhesive, face stock and thermal dye transfer imaged layers, the liner material must allow for efficient transport in manufacturing, image printing, image development, label converting and label application equipment. A label comprising a thermal dye transfer imaging layer, a base and a strippable liner adhesively connected by an adhesive to said base, wherein said base has a stiffness of between 15 and 60 millinewtons and an L* is greater than 92.0, and wherein said liner has a stiffness of between 40 and 120 millinewtons is preferred.

A peelable liner or back is preferred as the pressure sensitive adhesive required for adhesion of the label to the package, can not be transported through labeling equipment without the liner. The liner provides strength for conveyance and protects the pressure sensitive adhesive prior to application to the package. A preferred liner material is cellulose paper. A cellulose paper liner is flexible, strong and low in cost compared to polymer substrates. Further, a cellulose paper substrate allows for a textured label surface that can be desirable in some packaging applications. The paper may be provided with coatings that will provide waterproofing to the paper as the label element of the invention must be processed in aqueous chemistry to develop the image. An examples of a suitable water proof coatings applied to the paper are acrylic polymer, melt extruded polyethylene and oriented polyolefin sheets laminated to the paper. Paper is also preferred as paper can contain moisture and salt which provide antistatic properties that prevent static sensitization of the thermal dye transfer image layers.

Another preferred liner material or peelable back is an oriented sheet of polymer. The liner preferably is an oriented polymer because of the strength and toughness developed in the orientation process. Preferred polymers for the liner substrate include polyolefins, polyester and nylon. Preferred polyolefin polymers include polypropylene, polyethylene, polymethylpentene, polystyrene, polybutylene, and mixtures thereof. Polyolefin copolymers, including copolymers of propylene and ethylene such as hexene, butene, and octene are also useful. Polyester is most preferred, as it has desirable strength and toughness properties required for efficient transport of thermal dye transfer pressure sensitive label liner in high speed labeling equipment.

In another preferred embodiment, the liner consists of a paper core to which sheets of oriented polymer are laminated. The laminated paper liner is preferred because the oriented sheets of polymer provide tensile strength which allows the thickness of the liner to be reduced compared to coated paper and the oriented polymer sheet provides resistance to curl during manufacturing and drying in the thermal dye transfer process.

The tensile strength of the liner or the tensile stress at which a substrate breaks apart is an important conveyance and forming parameter. Tensile strength is measured by ASTM D882 procedure. A tensile strength greater than 120 MPa is preferred as liners less than 110 MPa begin to fracture in automated packaging equipment during conveyance, forming and application to the package.

The coefficient of friction or COF of the liner bearing the thermal dye transfer imaging layer is an important characteristic as the COF is related to conveyance and forming efficiency in automated labeling equipment. COF is the ratio of the weight of an item moving on a surface to the force that maintains contact between the surface and the item. The mathematical expression for COF is as follows:

$$COF = \mu = (\text{friction force/normal force})$$

The COF of the liner is measured using ASTM D-1894 utilizing a stainless steel sled to measure both the static and dynamic COF of the liner. The preferred COF for the liner of the invention is between 0.2 and 0.6. As an example, a 0.2 COF is necessary for coating on a label used in a pick-and-place application. The operation using a mechanical device to pick a label and move it to another point requires a low COF so the label will easily slide over the surface of the label below it. At the other extreme, large sheets such as book covers require a 0.6 COF to prevent them from slipping and sliding when they are piled on top of each other in storage. Occasionally, a particular material may require a high COF on one side and a low COF on the other side. Normally, the base material itself, such as a plastic film, foil, or paper substrate, would provide the necessary COF for one side. Application of an appropriate coating would modify the image side to give the higher or lower value. Conceivably, two different coatings could be used with one on either side. COF can be static or kinetic. The coefficient of static friction is the value at the time movement between the two surfaces is ready to start but no actual movement has occurred. The coefficient of kinetic friction refers to the case when the two surfaces are actually sliding against each other at a constant rate of speed. COF is usually measured by using a sled placed on the surface. The force necessary at the onset of sliding provides a measurement of static COF. Pulling the sled at a constant speed over a given length provides a measure of kinetic frictional force.

The preferred thickness of the liner of the invention is between 75 and 225 micrometers. Thickness of the liner is important in that the strength of the liner, expressed in terms of tensile strength or mechanical modulus, must be balanced with the thickness of the liner to achieve a cost efficient design. For example, thick liners that are high in strength are not cost efficient because thick liners will result in short roll lengths compared to thin liners at a given roll diameter. A liner thickness less that 60 micrometers has been shown to cause transport failure in the edge guided thermal dye transfer printers. A liner thickness greater than 250 micrometers yields a design that is not cost effective and is difficult to transport in existing thermal dye transfer printers.

The thermal dye transfer imaging is preferably applied to a label prior to application to a package. The flexible substrate of the label contains the necessary tensile strength properties and coefficient of friction properties to allow for efficient transport and application of the images in high speed labeling equipment. The face stock is supported and transported through labeling equipment using a tough liner material.

Because the thermal dye transfer imaging layer is vulnerable to environmental solvents such as water, coffee and hand oils, an environmental protection layer is preferably applied to the thermal dye transfer imaging layer after imaging. The environmental protection layer should be clear, i.e., transparent, and is preferably colorless. But it is specifically contemplated that the environmental protection layer can have some color for the purposes of color correction, or for special effects, so long as it does not detrimentally affect the formation or viewing of the image through the overcoat. Thus, there can be incorporated into the polymer, dyes that will impart color. In addition, additives can be incorporated into the polymer that will give to the overcoat, desired properties. Examples of protective overcoat materials are well known in the art of thermal dye transfer imaging.

The materials used in making the labels according to the present invention will now be described in greater detail. As indicate above, the dye-receiving layer in the pre-label receiver sheet is any layer that will serve the function of receiving the dye transferred from a dye donor. Suitably it comprises a polymeric binder containing a polyester or a polycarbonate or a combination thereof. A desirable combination includes the polyester and polycarbonate polymers in a weight ratio of from 0.8 to 4.0:1. Underneath the dye-receiving layer is a pragmatic polymer sheet which comprises a microvoided layer. In one preferred embodiment, the microvoided layer contains a continuous phase polyester matrix having dispersed therein a mixture of crosslinked organic microbeads and non-crosslinked polymer particles that are immiscible with the polyester matrix, said layer having a void volume of at least 25% by volume. Optionally, beneath the microvoided layer is an underlayer comprised of a voided or non-voided polyester material.

A function of the microvoided layer provides more compliant properties to the receiver. This is important as it impacts the degree of contact to the thermal head during printing. Higher compliance results in better contact and higher dye transfer efficiency due to improved thermal transfer.

In one embodiment of a label structure, for example, beneath the dye-image receiving layer there is a microvoided layer beneath which there is a second microvoided layer comprised of a second continuous phase polyester matrix having dispersed therein non-crosslinked polymer particles that are immiscible with the polyester matrix of said second microvoided layer. This composite comprising the two microvoided layers is coated, on the side opposite the image receiving layer, with an adhesive composition or laminated to a material comprising such a coating, to form the pragmatic label.

In an alternative embodiment, beneath the microvoided layer, there is a layer comprised of a non-voided polyester. The composite film comprising these two layers, in addition to the dye-image receiving layer, is then (on the side opposite the image receiving layer) coated with an adhesive composition, or laminated to a material comprising such a coating, to form the pragmatic label.

As indicated above, the microvoided layer of the label element can comprise a continuous phase polyester matrix having dispersed therein a mixture of two kinds of particles, crosslinked organic microbeads and non-crosslinked polymer particles. The non-crosslinked polymer particles are immiscible with the polyester matrix to form a microvoided layer with enhanced strength and quality.

Alternatively, a microvoided polyester matrix layer formed by using either microbeads or non-crosslinked polymer particles that are immiscible with the polyester matrix. However, it has been found that the tear-strength or robustness of a single layer may be improved by using a combination of two different types of microbeads. By mixing both the crosslinked organic microbeads and the non-crosslinked polymer particles that are immiscible with the polyester matrix into the polyester matrix of the microvoided layer, the deficiencies of the void initiators when used singularly can be improved upon.

The term voids or microvoids means pores formed in an oriented polymeric film during stretching as the result of a void-initiating particle. In the preferred embodiment, these pores are initiated by either crosslinked organic microbeads and/or non-crosslinked polymer particles. The term "microbead" means synthesized polymeric spheres which, in the present invention, are cross-linked.

The continuous phase polyester matrix of the microvoided layer preferably comprises any polyester and preferably comprises polyethylene(terephthalate) or a copolymer thereof. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexane-dicarboxylic, sodiosulfoisophthalic, and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well-known techniques, for example, those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The polyester utilized in the invention should have a glass transition temperature from 50 degrees C. to 150 degrees C., preferably from 60 to 100 degrees C., should be orientable, and have an intrinsic viscosity of at least 0.50 centipoise (cps), preferably from 0.55 to 0.9 cps. Examples include a blend comprising polyethylene(terephthalate) and poly(1,4-cyclohexylene dimethyhlene terephthalate).

Crosslinked organic microbead spheres may range in size from 0.2 to 30 micrometers. They are preferably in the range of from 0.5 to 5.0 µm. Crosslinked organic microbeads comprising a polystyrene, polyacrylate, polyallylic, or poly(methacrylate) polymer are preferred. See also commonly assigned copending U.S. Ser. No. 10/374,639 filed Feb. 26, 2003 and U.S. Ser. No. 10/033,457 filed Dec. 27, 2001, hereby incorporated by reference in their entirety.

Preferred polymers for use in the crosslinked organic microbeads may be cross-linked and may be selected from the group consisting of alkenyl aromatic compounds having the general formula:

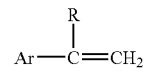

wherein Ar represents an aromatic hydrocarbon moiety, or an aromatic halohydrocarbon moiety of the benzene series and R may be hydrogen or methyl moiety, acrylate-type monomers including monomers of the formula:

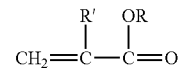

wherein R may be selected from the group consisting of hydrogen and an alkyl moiety containing from 1 to 12 carbon atoms and R' may be selected from the group consisting of hydrogen and methyl; copolymers of vinyl chloride and vinylidene chloride, acrylonitrile and vinyl chloride, vinyl bromide, vinyl esters having the formula:

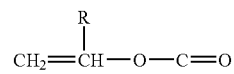

wherein R may be an alkyl group containing from 2 to 18 carbon atoms; acrylic acid, methacrylic acid, itaconic acid, citraconic acid, maleic acid, fumaric acid, oleic acid, vinylbenzoic acid; the synthetic polyester resins which may be prepared by reacting terephthalic acid and dialkyl terephthalics or ester-forming derivatives thereof, with a glycol of the series $HO(CH_2)_nOH$, wherein n may be a whole number within the range of 2–10 and having reactive olefinic linkages within the polymer molecule, the hereinabove described polyesters which include copolymerized therein up to 20 percent by weight of a second acid or ester thereof having reactive olefinic unsaturation and mixtures thereof, and a cross-linking agent selected from the group consisting of divinyl-benzene, diethylene glycol dimethacrylate, diallyl fumarate, diallyl phthalate, and mixtures thereof.

Examples of typical monomers for making crosslinked organic microbeads include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethyl-propane sulfonic acid, vinyl toluene, trimethylol propane triacrylate. Preferably, the cross-linked polymer may be poly(butyl acrylate) or poly (methyl methacrylate). Most preferably, it is a mixture of the two, and the cross-linking agent is trimethylol propane triacrylate.

For the polymer used to form the crosslinked organic microbead to have desired physical properties such as resiliency, the polymer may be cross-linked. In the case of styrene cross-linked with divinylbenzene, the polymer may be from 2.5 to 50% cross-linked, and preferably from 20 to 40% cross-linked. Percent cross-linked means the mol % of cross-linking agent based on the amount of primary monomer. Such limited cross-linking produces crosslinked organic microbeads which are sufficiently coherent to remain intact during orientation of the continuous polymer. Crosslinked organic microbeads of such cross-linking may also be resilient, so that when they are deformed or flattened during orientation by pressure from the matrix polymer on opposite sides of the crosslinked organic microbeads, they subsequently resume their normal spherical shape to produce the largest possible voids around the crosslinked organic microbeads, thereby producing articles with less density.

Crosslinked organic microbeads may have a coating of a "slip agent". "Slip" means the friction at the surface of the crosslinked organic microbeads is greatly reduced. Actually, it is believed this may be caused by the silica acting as miniature ball bearings at the surface. Slip agent may be formed on the surface of the crosslinked organic microbeads during their formation by including it in the suspension polymerization mix. Suitable slip agents or lubricants include colloidal silica, colloidal alumina, and metal oxides such as tin oxide and aluminum oxide. Preferred slip agents are colloidal silica and alumina, most preferably, silica. The cross-linked polymer having a coating of slip agent may be prepared by procedures well known in the art. Conventional suspension polymerization processes, wherein the slip agent is added to the suspension, are preferred.

Crosslinked organic microbeads coated with slip agent may be prepared by various methods. The crosslinked organic microbeads may be prepared, for example, by a procedure in which monomer droplets containing an initiator may be sized and heated to give solid polymer spheres of the same size as the monomer droplets. In a preferred method, the polymer may be polystyrene cross-linked with divinylbenzene. Crosslinked organic microbeads may have a coating of silica. The concentration of divinylbenzene may be adjusted up or down to result in from 2.5 to 50% cross-linking by the active cross-linker, and preferably from 10 to 40% cross-linking by the active cross-linker. Of course, monomers other than styrene and divinylbenzene may be used in similar suspension polymerization processes known in the art. Also, other initiators and promoters may be used as known in the art. Slip agents other than silica may also be used. For example, a number of LUDOX® colloidal silicas are available from DuPont. LEPANDIN® colloidal alumina is available from Degussa. NALCOAG® colloidal silicas are available from Nalco, and tin oxide and titanium oxide are also available from Nalco.

Crosslinked organic microbead size may be regulated by the ratio of silica to monomer. For example, the following ratios produce the indicated size crosslinked organic microbead:

| Crosslinked Organic Microbead Size μm | Monomer, Parts by Wt. | Slip Agent (Silica) Parts by Wt. |
|---|---|---|
| 2 | 10.4 | 1 |
| 5 | 27.0 | 1 |
| 20 | 42.4 | 1 |

Crosslinked organic microbeads can be dispersed into a polyester matrix prior to extruding a pre-stretched film. This may be typically accomplished using a melt compounding process utilizing a twin screw extruder.

Processes well known in the art yield crosslinked organic microbeads suitable for use in the present invention. The processes known for making non-uniformly sized crosslinked organic microbeads may be characterized by broad particle size distributions and the resulting crosslinked organic beads may be classified by screening to produce beads spanning the range of the original distribution of sizes. Other processes such as suspension polymerization and limited coalescence directly yield very uniformly sized microbeads. Preferably, the crosslinked organic microbeads are synthesized using the limited coalescence process. This process is described in detail in U.S. Pat. No. 3,615,972. Preparation of the coated crosslinked organic microbeads for use in the present invention does not utilize a blowing agent as described in U.S. Pat. No. 3,615,972.

"Limited coalescence" is a phenomenon wherein droplets of liquid dispersed in certain aqueous suspending media coalesce, with formation of a lesser number of larger droplets, until the growing droplets reach a certain critical and limiting size, whereupon coalescence substantially ceases. The resulting droplets of dispersed liquid, which may be as large as 0.3 and sometimes 0.5 centimeter in diameter, are quite stable, as regards further coalescence, and are remarkably uniform in size. If such a large droplet dispersion is vigorously agitated, the droplets may be fragmented into smaller droplets. The fragmented droplets, upon quiescent standing, again coalesce to the same limited degree and form the same uniform-sized, large droplet, stable dispersion. Thus, a dispersion resulting from the limited coalescence comprises droplets of substantially uniform diameter that are stable in respect to further coalescence.

The principles underlying the limited coalescence phenomenon have now been adapted to cause the occurrence of limited coalescence in a deliberate and predictable manner in the preparation of dispersions of polymerizable liquids in the form of droplets of uniform and desired size.

In the phenomenon of limited coalescence, the small particles of solid colloid tend to collect with the aqueous liquid at the liquid-liquid interface, that is, on the surface of the oil droplets. It is thought that droplets which are substantially covered by such solid colloid may be stable to coalescence while droplets which are not so covered may not be stable. In a given dispersion of a polymerizable liquid, the total surface area of the droplets is a function of the total volume of the liquid and the diameter of the droplets. Similarly, the total surface area barely coverable by the solid colloid, for example, in a layer one particle thick, is a function of the amount of the colloid and the dimensions of the particles thereof. In the dispersion as initially prepared, for example, by agitation, the total surface area of the polymerizable liquid droplets may be greater than may be covered by the solid colloid. Under quiescent conditions, the unstable droplets begin to coalesce. The coalescence results in a decrease in the number of oil droplets and a decrease in the total surface area thereof up to a point at which the amount of colloidal solid may be barely sufficient to cover the total surface of the oil droplets, whereupon coalescence substantially ceases.

If the solid colloidal particles do not have nearly identical dimensions, the average effective dimension may be estimated by statistical methods. For example, the average effective diameter of spherical particles may be computed as the square root of the average of the squares of the actual diameters of the particles in a representative sample.

It may be beneficial to treat the uniform droplet suspension prepared as described above to render the suspension stable against congregation of the oil droplets. This further stabilization may be accomplished by gently admixing an agent capable of greatly increasing the viscosity of the aqueous liquid with the uniform droplet dispersion. For this purpose, any water-soluble or water-dispersible thickening agent may be used that is insoluble in the oil droplets and that does not remove the layer of solid colloidal particles covering the surface of the oil droplets at the oil-water interface. Examples of suitable thickening agents may be sulfonated polystyrene, for example, water-dispersible, thickening grade, hydrophilic clays such as Bentonite, digested starch, natural gums, and carboxy-substituted cellulose ethers. The thickening agent may be selected and employed in such quantities as to form a thixotropic gel in which the uniform-sized droplets of the oil may be suspended. In other words, the thickened liquid generally should be non-Newtonian in its fluid behavior, that is, of a nature to prevent rapid movement of the dispersed droplets within the aqueous liquid by the action of gravitational force due to the difference in density of the phases. The stress exerted on the surrounding medium by a suspended droplet may not be sufficient to cause rapid movement of the droplet within such non-Newtonian media. Usually, the thickener agents may be employed in such proportions relative to the aqueous liquid that the apparent viscosity of the thickened aqueous liquid is in the order of at least 500 centipoise as determined by means of a Brookfield viscometer using the No. 2 spindle at 30 rpm. The thickening agent is preferably prepared as a separate concentrated aqueous composition that is then carefully blended with the oil droplet dispersion. The resulting thickened dispersion is capable of being handled, for example, passed through pipes, and may be subjected to polymerization conditions substantially without mechanical change in the size or shape of the dispersed oil droplets.

The resulting dispersions may be particularly well suited for use in continuous polymerization procedures that may be carried out in coils, tubes, and elongated vessels adapted for continuously introducing the thickened dispersions into one end and for continuously withdrawing the mass of polymer beads from the other end. The polymerization step may also be practiced in batch manner.

The order of the addition of the constituents to the polymerization usually is not critical, but it may be more convenient to add the water, dispersing agent, and incorporated oil-soluble catalyst to the monomer mixture to a vessel and subsequently add the monomer phase to the water phase with agitation.

The following general procedure may be utilized in a limited coalescence technique:

1. The polymerizable liquid is dispersed within an aqueous non-solvent liquid medium to form a dispersion of droplets having sizes not larger than the size desired for the polymer globules, whereupon 2. The dispersion is allowed to rest and to reside with only mild or no agitation for a time during which a limited coalescence of the dispersed droplets takes place with the formation of a lesser number of larger droplets, such coalescence being limited due to the composition of the suspending medium, the size of the dispersed droplets thereby becoming remarkably uniform and of a desired magnitude, and 3. The uniform droplet dispersion is then stabilized by addition of thickening agents to the aqueous suspending medium, whereby the uniform-sized dispersed droplets are further protected against coalescence and are also retarded from concentrating in the dispersion due to difference in density of the disperse phase and continuous phase, and 4. The polymerizable liquid or oil phase in such stabilized dispersion is subjected to polymerization conditions and polymerized, whereby globules of polymer are obtained having spheroidal shape and remarkably uniform and desired size, which size is predetermined principally by the composition of the initial aqueous liquid suspending medium.

The diameter of the droplets of polymerizable liquid and, hence, the diameter of the beads of polymer, may be varied predictably, by deliberate variation of the composition of the aqueous liquid dispersion, within the range of from 0.5 µm or less to 0.5 centimeter. For any specific operation, the range of diameters of the droplets of liquid and, hence, of polymer beads, has a factor in the order of three or less as contrasted to factors of 10 or more for diameters of droplets and beads prepared by usual suspension polymerization methods employing critical agitation procedures. Since bead size, for example, diameter, is determined principally by the composition of the aqueous dispersion, the mechanical conditions, such as the degree of agitation, the size and design of the apparatus used, and the scale of operation are not highly critical. Furthermore, by employing the same composition, the operations may be repeated, or the scale of operations may be changed, and substantially the same results may be obtained.

One bead formation method may be carried out by dispersing one part by volume of a polymerizable liquid into at least 0.5, preferably from 0.5 to 10 or more parts by volume of a non-solvent aqueous medium comprising water and at least the first of the following ingredients:

1. A water-dispersible, water-insoluble solid colloid, the particles of which, in aqueous dispersion, have dimensions in the order of from 0.008 to 50 µm, which particles tend to gather at the liquid-liquid interface or are caused to do so by the presence of 2. A water-soluble "promoter" that affects the "hydrophilic-hydrophobic balance" of the solid colloid particles; and/or 3. An electrolyte; and/or 4. Colloid-active modifiers such as peptizing agents, and surface-active agents; and usually, 5. A water-soluble, monomer-insoluble inhibitor of polymerization.

The water-dispersible, water-insoluble solid colloids may be inorganic materials, such as metal salts, hydroxides or clays, or may be organic materials, such as raw starches, sulfonated cross-linked organic high polymers, and resinous polymers.

In this embodiment, the solid colloidal material should be insoluble but dispersible in water and both insoluble and nondispersible in, but wettable by, the polymerizable liquid.

The solid colloids should be much more hydrophilic than oleophilic to remain dispersed wholly within the aqueous liquid. The solid colloids employed for limited coalescence are ones having particles that, in the aqueous liquid, retain a relatively rigid and discrete shape and size within the limits stated. The particles may be greatly swollen and extensively hydrated, provided that the swollen particle retains a definite shape, in which case the effective size may be approximately that of the swollen particle. The particles may be single molecules, as in the case of extremely high molecular weight cross-linked resins, or may be aggregates of many molecules. Materials that disperse in water to form true or colloidal solutions in which the particles have a size below the range stated or in which the particles may be so diffuse as to lack a discernible shape and dimension may be not suitable as stabilizers for limited coalescence. The amount of solid colloid that may be employed usually corresponds to from 0.01 to 10 or more grams per 100 cubic centimeters of the polymerizable liquid.

In order to function as a stabilizer for the limited coalescence of the polymerizable liquid droplets, it may be essential that the solid colloid should tend to collect with the aqueous liquid at the liquid-liquid interface, that is, on the surface of the oil droplets. The term "oil" may be occasionally used herein as generic to liquids that are insoluble in water. In many instances, it may be desirable to add a "promoter" material to the aqueous composition to drive the particles of the solid colloid to the liquid-liquid interface. This phenomenon is well known in the emulsion art, and is here applied to solid colloidal particles, as an expanded means of adjusting the "hydrophilic-hydrophobic balance".

Usually, the promoters are organic materials that have an affinity for the solid colloid and also for the oil droplets and that may be capable of making the solid colloid more oleophilic. The affinity for the oil surface may be due to some organic portion of the promoter molecule, while affinity for the solid colloid may be due to opposite electrical charges. For example, positively charged complex metal salts or hydroxides, such as aluminum hydroxide, may be promoted by the presence of negatively charged organic promoters such as water-soluble sulfonated polystyrenes, alignates, and carboxymethylcellulose. Negatively charged colloids, such as Bentonite, may be promoted by positively charged promoters such as tetramethyl ammonium hydroxide or chloride or water-soluble complex resinous amine condensation products, such as the water-soluble condensation products of diethanolamine and adipic acid, the water-soluble condensation products of ethylene oxide, urea and formaldehyde, and polyethylenimine. Amphoteric materials, such as proteinaceous materials like gelatin, glue, casein, albumin, or glutin, may be effective promoters for a wide variety of colloidal solids. Nonionic materials like methoxycellulose may also be effective in some instances. Usually, the promoter should be used only to the extent of a few parts per million of aqueous medium, although larger proportions may often be tolerated. In some instances, ionic materials normally classed as emulsifiers, such as soaps, long chain sulfates and sulfonates and the long chain quaternary ammonium compounds, may also be used as promoters for the solid colloids, but care should be taken to avoid causing the formation of stable colloidal emulsions of the polymerizable liquid and the aqueous liquid medium.

An effect similar to that of organic promoters may be obtained with small amounts of electrolytes, for example, water-soluble, ionizable alkalis, acids and salts, particularly those having polyvalent ions. These may be useful when the excessive hydrophilic or insufficient oleophilic characteristic of the colloid is attributable to excessive hydration of the colloid structure. For example, a suitably cross-linked sulfonated polymer of styrene may be swollen and hydrated in water. Although the molecular structure contains benzene rings which should confer on the colloid some affinity for the oil phase in the dispersion, the degree of hydration causes the colloidal particles to be enveloped in a cloud of associated water. The addition of a soluble, ionizable polyvalent cationic compound, such as an aluminum or calcium salt, to the aqueous composition may cause extensive shrinking of the swollen colloid with exudation of a part of the associated water and exposure of the organic portion of the colloid particle, thereby making the colloid more oleophilic.

The solid colloidal particles whose hydrophilic-hydrophobic balance may be such that the particles tend to gather in the aqueous phase at the oil-water interface, gather on the surface of the oil droplets, and function as protective agents during limited coalescence.

Other agents that may be employed in an already known manner to effect modification of the colloidal properties of the aqueous composition are those materials known in the art as peptizing agents, flocculating and deflocculating agents, sensitizers, and surface active agents.

It is sometimes desirable to add a few parts per million of a water-soluble, oil-insoluble inhibitor of polymerization to the aqueous liquid to prevent the polymerization of monomer molecules that might diff-use into the aqueous liquid or that might be absorbed by colloid micelles and that, if allowed to polymerize in the aqueous phase, would tend to make emulsion-type polymer dispersions instead of, or in addition to, the desired bead or pearl polymers.

The aqueous medium containing the water-dispersible solid colloid may then be admixed with the liquid polymerizable material in such a way as to disperse the liquid polymerizable material as small droplets within the aqueous medium. This dispersion may be accomplished by any usual means, for example, by mechanical stirrers or shakers, by pumping through jets, by impingement, or by other procedures causing subdivision of the polymerizable material into droplets in a continuous aqueous medium.

The degree of dispersion, for example, by agitation, is not critical, although the size of the dispersed liquid droplets should be no larger, and may be preferably much smaller, than the stable droplet size expected and desired in the stable dispersion. When such condition has been attained, the resulting dispersion may be allowed to rest with only mild, gentle movement, if any, and preferably without agitation. Under such quiescent conditions, the dispersed liquid phase undergoes a limited degree of coalescence.

In the case of non-cross linked polymer particles in the voided layer, such particles should be immiscible with the polyester matrix. Typical non-crosslinked polymer particles that are immiscible with the polyester matrix particles are olefins. The preferred olefin non-crosslinked polymer particles which may be blended with the polyester matrix are a homopolymers or copolymers of polypropylene or polyethylene. Polypropylene is preferred.

Preferred polyolefin non-crosslinked polymer particles are immiscible with the polyester matrix component of the film and exists in the form of discrete non-crosslinked polymer particles dispersed throughout the oriented and heat set film. Voiding occurs between the non-crosslinked polymer particles and the polyester matrix, when the film is stretched. Suitably, the non-crosslinked polymer particles should be blended with the linear polyester matrix prior to extrusion through the film forming die by a process which results in a loosely blended mixture and does not develop an intimate bond between the polyester matrix and the preferred polyolefin non-crosslinked polymer particles.

Such a blending operation preserves the incompatibility of the components and leads to voiding when the film is stretched. A process of dry blending the polyester matrix and preferred polyolefin non-crosslinked polymer particles has been found to be useful. For instance, blending may be accomplished by mixing finely divided, for example powdered or granular, polyester matrix and non-crosslinked polymer particles and thoroughly mixing them together, for example, by tumbling them.

In one embodiment of a microvoided layer for the label element, in which the microvoided layer comprises both crosslinked and non-crosslinked particles, crosslinked organic microbeads are first dispersed into a polyester matrix prior to the film forming process. This may be accomplished by feeding both the polyester matrix, in either pellet or powder form, and the crosslinked organic microbeads into a twin screw extruder. The polyester matrix may be melted and the crosslinked organic microbeads may be dispersed into the polyester melt in the twin screw extruder. The resulting extrudate may be then quenched in a water bath and then pelletized into pellets to be used in the film forming process. These pellets may be then dry blended with the preferred polyolefin non-crosslinked polymer particle of choice, typically a polypropylene. The preferred polyolefin non-crosslinked polymer particle may be typically in pellet form as well. Pellets of polyester matrix may also be added to the dry blend if modifications to the volumetric loading of the crosslinked organic microbeads and the non-crosslinked polymer particles are desired. The ratio of the volume of crosslinked organic microbeads used relative to the volume of the non-crosslinked polymer particle polymer used in the final blend may range from 4:1 to 1:4, preferably 2:3 to 3:2. In this embodiment, a preferred ratio is about 1:1.

Optionally, the resulting mixture, for making the microvoided layer, may be fed to a film forming extruder along with a material for the one or more other layers to be coextruded, thereby forming a pragmatic polymer sheet in the form of a composite film (multilayer). The extrusion, quenching and stretching of the composite film may be effected by any process which is known in the art for producing oriented polyester film, for example by a flat film process or a bubble or tubular process. The flat film process is preferred for making the film and involves extruding the blend through a slit die and rapidly quenching the extruded web upon a chilled casting drum so that the polyester matrix component of the film may be quenched into the amorphous state. The quenched composite film may be then biaxially oriented by stretching in mutually perpendicular directions at a temperature above the glass-rubber transition temperature of the polyester matrix. Generally the composite film is stretched in one direction first and then in the second direction although stretching may be effected in both directions simultaneously if desired. In a typical process, the composite film is stretched firstly in the direction of extrusion over a set of rotating rollers or between two pairs of nip rollers and is then stretched in the direction transverse thereto by means of a tenter apparatus. The composite film may be stretched in each direction to 2.5 to 4.5 times its original dimension in the direction of stretching. The ratio of the stretching in each direction is preferably such as to form voids in the sheet with a width to length ratio of from 1:1 to 2:1. After the composite film has been stretched it may be heat set by heating to a temperature sufficient to crystallize the polyester matrix while restraining the composite film against retraction in both directions of stretching. When a non-crosslinked polymer particle is used in the voided layer, the voiding tends to collapse as the heat setting temperature is increased and the degree of collapse increases as the temperature increases. Hence the void volume decreases with an increase in heat setting temperatures. While heat setting temperatures up to 230° C. may be used without destroying the voids when only crosslinked organic microbeads are used in the voided layer, temperatures below 155° C. may result in a greater degree of voiding when non-crosslinked polymer particle voiding agent is used.

The size of the microvoids formed is determined by the size of the crosslinked organic microbead or non-crosslinked polymer particle used to initiate the void and by the stretch ratio used to stretch the oriented polymeric film. The pores may range from 0.6 to 150 µm in machine and cross machine directions of the film. They typically range from 0.2 to 30 µm in height. Preferably the height of the pores is in the range of 0.5 to 15.0 µm.

A void volume of from 25% to 55% is preferred for thermal dye transfer label elements. The density of the microvoided layer should be less than 0.95 grams/cc. The preferred range is 0.40 to 0.90 grams/cc.

One embodiment of the thermal dye-transfer label receiving elements of the invention comprises, on the top surface, a dye-image receiving layer that may comprise, for example, a polycarbonate, a polyurethane, a polyester, polyvinyl chloride, poly(styrene-co-acrylonitrile), poly(caprolactone) or mixtures thereof. The dye image-receiving layer may be present in any amount which is effective for the intended purpose. In general, good results have been obtained at a concentration of from about 1 to about 5 g/m$^2$. In a preferred embodiment of the invention, the dye image-receiving layer is a polycarbonate, polyester or blend of the two. The term "polycarbonate" as used herein means a polyester of carbonic acid and a glycol or a dihydric phenol. Examples of such glycols or dihydric phenols are p-xylylene glycol, 2,2-bis(4-oxyphenyl)propane, bis(4-oxyphenyl)methane, 1,1-bis(4-oxyphenyl)ethane, 1,1-bis(oxyphenyl)butane, 1,1-bis(oxyphenyl)cyclohexane, and 2,2-bis(oxyphenyl)butane. In a particularly preferred embodiment, a bisphenol-A polycarbonate having a number average molecular weight of at least about 25,000 is used. Examples of preferred polycarbonates include General Electric LEXAN® Polycarbonate Resin and Bayer AG MACROLON 5700®.

In a preferred embodiment of the invention, the dye-image receiving layer comprises a polymeric binder containing a polyester and/or polycarbonate. In another embodiment, the dye-image receiving layer comprises a blend of a polyester and a polycarbonate polymer. Preferably, such blends comprise the polyester and polycarbonate in a weight ratio of polyester to polycarbonate of 10:90 to 90:10, preferably 0.8:1 to 4.0:1. In the preferred embodiment, the polyester comprises polyethylene(terephthalate) or a blend thereof. For example, in one embodiment of the invention, a polyester polymer is blended with an unmodified bisphenol-A polycarbonate and at a weight ratio to produce the desired Tg of the final blend and to minimize cost. Conveniently, the polycarbonate and polyester polymers may be blended at a weight ratio of from about 75:25 to about 25:75. The following polyester polymers E-1 and E-2 comprised of recurring units of the illustrated monomers, are examples of polyester polymers usable in the receiving layer polymer blends of the invention.

E-1: Polymer derived from 1,4-cyclohexanedicarboxylic acid, 4,4'-bis(2-hydroxyethyl)bisphenol-A and 1,4-cyclohexanedimethanol represented by the following structure:

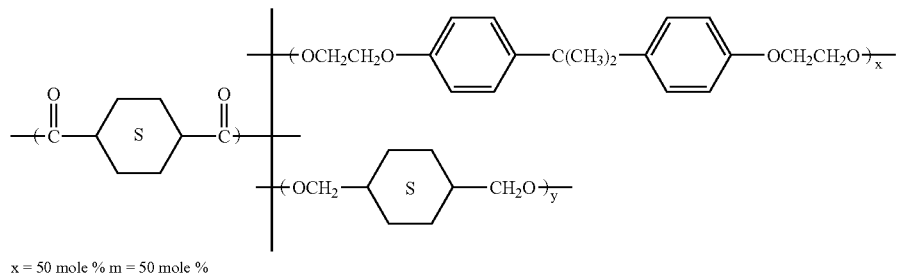

x = 50 mole % m = 50 mole %

(Mole % Based on Total Monomer Charge of Acid and Glycol Monomers)

E-2: A polymer, useful in making an extruded dye-receiving layer, is derived from 1,4-cyclohexanedicarboxylic acid, 1,4-cyclohexanedimethanol, 4,4'-bis(2-hydroxyethyl)bisphenol-A and 2-ethyl-2-(hydroxymethyl)-1,3-propanediol represented by the following structure.

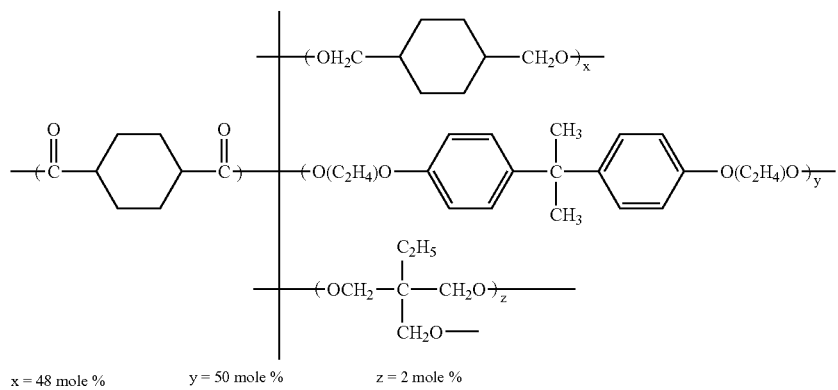

x = 48 mole %    y = 50 mole %    z = 2 mole %

Further examples of polymeric compositions and related processing of dye-receiving layers are disclosed in commonly assigned, concurrently filed copending U.S. Ser. No. 10/376,188 filed Feb. 26, 2003 hereby incorporated by reference in its entirety.

As conventional, the dye-image receiving layer further can further comprise a release agent. Conventional release agents include but are not limited to silicone or fluorine based compound. Resistance to sticking during thermal printing may be enhanced by the addition of such release agents to the dye-receiving layer or to an overcoat layer. Various releasing agents are disclosed, for example, in U.S. Pat. Nos. 4,820,687 and 4,695,286, the disclosures of which are hereby incorporated by reference in their entirety.

A preferred release agent, especially for an extruded dye-receiving layer, are high or ultrahigh molecular weight silicone-based compounds. Preferably, the weight average molecular weight of the compound or polymer should be at least 100,000, more preferably at least 500,000, most preferably at least 1,000,000, for example, between 1,000,000 and 5,000,000. The silicone release agent should be compatible with the polymers used in the dye receiving layer. When the dye-receiving layer contains a polycarbonate, it is preferred for the release agent to have hydroxy terminal groups to improve the compatibility of the silicone compound in the polycarbonate-containing blend.

High or ultrahigh molecular weight silicone release agents are commercially available, for example, from Dow Corning (Midland, Mich.), including MB50-315 and MB-010. MB50-315 is a hydroxy-terminated dimethyl siloxane. MB50-315 silicone material is commercially available as a 50 weight percent mixture of pelletized solid polydimethylsiloxane dispersed in polycarbonate polymer. Depending on the composition of the dye-receiving layer, other dispersions may be preferred, for example, MB50-010 from Dow Corning which is a dispersion in polyester.

A plasticizer may be present in the dye image-receiving layer in any amount which is effective for the intended purpose. In general, good results have been obtained when the plasticizer is present in an amount of from about 5 to about 100%, preferably from about 10 to about 20%, based on the weight of the polymeric binder in the dye image-receiving layer.

In one embodiment of the invention, an aliphatic ester plasticizer is employed in the dye image-receiving layer. Suitable aliphatic ester plasticizers include both monomeric esters and polymeric esters. Examples of aliphatic monomeric esters include ditridecyl phthalate, dicyclohexyl phthalate and dioctylsebacate. Examples of aliphatic polyesters include polycaprolactone, poly(1,4-butylene adipate) and poly(hexamethylene sebacate).

In a preferred embodiment of the invention, the monomeric ester is dioctylsebacate or bis-(1-octyloxy-2,2,6,6-tetramethyl-4-piperidinyl) sebacate, Tinuvin 123® (Ciba Geigy Co.). In another preferred embodiment, the aliphatic polyester is poly(1,4-butylene adipate) or the 1,3-butane diol polymer with hexanedioc acid, 2-ethylhexyl ester, poly(1,3-butylene glycol adipate) sold commercially as Admex 429® (Velsicol Chemical Corp.), or poly(hexamethylene sebacate).

It has been found advantageous to include, as an additive to the composition of the dye-receiving layer, a phosphorous-containing stabilizer such as phosphorous acid or an organic diphosphite such as bis(2-ethylhexyl)phosphite, to prevent degradation of the polyester polymer blend during high temperature melt extrusion. The phosphorous stabilizer can be combined, for example, with a plasticizer such as dioctyl sebacate or the like. Preferably, to improve compatibility, the plasticizer is combined with the stabilizer prior to combining both with the other components of the dye-receiving layer. Further details of a preferred dye-receiving element are disclosed in copending, commonly assigned U.S. Ser. No. 10/376,188 filed Feb. 26, 2003, hereby incorporated by reference.

As mentioned above, an optional layer can be coextruded below the microvoided layer. Such a layer can be a polyester layer comprising a voided or non-voided material. In a preferred embodiment, this underlayer comprises a microvoided layer comprising any polyester, conveniently comprising polyethylene(terephthalate) or a copolymer thereof, having immiscible particles, suitably particles based on a polyolefin having an olefinic backbone. Examples include polypropylene, polyethylene, and polystyrene, especially polypropylene.

The microvoided layer desirably has a density of less than 0.95 grams/cc and, more typically, a density of between 0.4 and 0.85 grams/cc. The microvoided layer, in this case, desirably has a void volume of greater than 30 volume % with a void volume of 35–55% being typical. The microvoided layer can be designed to provide antistatic properties by, for example, using a conductive polyester such as the copolyester EASTASTAT GSP12 commercially available from Eastman Chemical Co. (Kingston, Tenn.).

A pressure-sensitive label adhesive is utilized in the invention to allow a thermal-dye-transfer packaging label to be adhered to the surface of the package typically utilizing high speed packaging equipment. "Peelable separation" or "peel strength" or "separation force" is a measure of the amount of force required to separate the thermal dye transfer label from the package to which the label has been applied. The peel strength is the amount of force required to separate two surfaces that are held together by internal forces of the label adhesive which consist of valence forces or interlocking action, or both. Peel strength is measured using an Instron gauge and peeling the sample at 180 degrees with a crosshead speed of 1.0 meters/min. The sample width is 5 cm and the distance peeled is 10 cm in length.

A peelable label adhesive can be utilized to allow the consumer to separate the label from the package. Separation of a label from the package would allow for example, rebate coupons to be attached to the package or used to for consumer promotions. For a peelable label adhesive, the preferred peel strength between the thermal dye transfer pressure sensitive label and the package is no greater than 80 grams/cm. A peel strength greater than 100 grams/cm, consumers would begin to have difficulty separating the image from the package. Further, at peel strengths greater than 110 grams/cm, the force is beginning to approach the internal strength of paper substrate, causing an unwanted fracture of the paper substrate before the separation of the image from the package. A peelable label can be useful for allowing collection of high quality labels.

Upon separation of the image (label) from the underlying substrate, the peelable label adhesive has a preferred repositioning peel strength between 20 grams/cm and 100 grams/cm. Repositioning peel strength is the amount of force required to peel the separated image containing an label adhesive from a stainless steel block at 23° C. and 50% RH. At repositioning peel strengths less than 15 grams/cm, the label adhesive lacks sufficient peel strength to remain adhered to a variety of surfaces such as refrigerators or photo albums. At peel strengths greater than 120 grams/cm, the label adhesive is too aggressive, not allowing the consumer to later reposition the image.

The peelable label adhesive used in this invention may be a single layer or two or more layers. For a label having two adhesive layers, an upper and lower adhesive layer, for example, a lower adhesive layer preferentially adheres to the substrate to which the label is attached, while an upper adhesive layer preferentially a carrier. (On the other hand, the lower adhesive layer must be more easily separable from the carrier than the upper adhesive layer from its underlying layer.) The separation of the upper adhesive layer from its underlying layer allows the removal of a "successive pragmatic label" (without carrier) capable of repositioning. A "successive pragmatic label" can consist of the face stock or original pragmatic label minus layers under the upper adhesive layer, excluding the lower adhesive layer adhered to the substrate or objective body and the layer or layers between the two adhesive layers. As the "successive pragmatic label" is separated from the substrate, this allows an upper adhesive layer to be adhered to a "successive label base" for repositioning of the successive pragmatic label.

A carrier that comprises a release layer for a label adhesive that repositions is preferred. The release layer allows for uniform separation of the label adhesive at the label adhesive-carrier interface. The release layer may be applied to the liner by any method known in the art for applying a release layer to a substrate. Examples include silicone coatings, tetrafluoroethylene fluorocarbon coatings, fluorinated ethylene-propylene coatings, and calcium stearate.

For single or multiple layer label adhesive systems, the preferred label adhesive composition is selected from the group consisting of natural rubber, synthetic rubber, acrylics, acrylic copolymers, vinyl polymers, vinyl acetate-, urethane, acrylate-type materials, copolymer mixtures of vinyl chloride-vinyl acetate, polyvinylidene, vinyl acetate-acrylic acid copolymers, styrene butadiene, carboxylated styrene butadiene copolymers, ethylene copolymers, polyvinyl alcohol, polyesters and copolymers, cellulosic and modified cellulosic, starch and modified starch compounds, epoxies, polyisocyanate, polyimides.

Water based pressure-sensitive adhesion provide some advantages for the manufacturing process of non-solvent emissions. A repositionable peelable label adhesive containing a non-adhesive solid particles randomly distributed in the label adhesive layer aids in the ability to stick and then remove the label to get the desired end result. The most preferred pressure-sensitive peelable label adhesive is a respositionable label-adhesive layer containing at about 5% to 20% by weight of a permanent label adhesive such as isooctyl acrylate/acrylic acid copolymer and at about 95% to 80% by weight of a tacky elastomeric material such as acrylate microspheres with the label adhesive layer coverage at about 5 to 20 g/m$^2$.

The preferred peelable-label adhesive materials may be applied using a variety of methods known in the art to produce thin, consistent label adhesive coatings. Examples include gravure coating, rod coating, reverse roll coating, and hopper coating. The label adhesives may be coated on the carrier/liner or a component sheet of the carrier prior to lamination.

In other embodiments, a permanent or non-peelable label-adhesive composition is preferred. For single or multiple-layer label-adhesive systems, this permanent label-adhesive composition is selected from the group consisting of epoxy, phenoformaldehyde, polyvinyl butyral, cyanoacrylates, rubber based label adhesives, styrenelbutadiene based label adhesives, acrylics and vinyl derivatives. Peelable label adhesives and permanent label adhesives may be used in combination in the same layer or in different locations in the support structure.

The thermal dye transfer imaging layers on a pressure sensitive substrate preferably are applied to a variety of packages in automated labeling equipment. Preferred package types are bottles, can, stand up pouch, box and a bag. The packages may contain materials that require a package for sale. Preferred materials that are packaged include liquids and particulate.

A thermal-dye-transfer packaging label made by the present invention preferably has a thickness of less than 250 μm. A thermal dye transfer packaging label assembly greater than 250 μm offers no significant improvement in either imaging quality or packaging label performance. Further, transport through high speed packaging equipment is difficult at a label thickness greater than 250 μm and stripping the labels utilizing the Bernoulli method is difficult if the thickness is too great.

In one embodiment, the initial score cut of the pre-label pragmatic sheet and the adhesive layer is preferably accomplished by multiple double edged circular razor discs, 6.35 cm diameter, 0.30 mm thick, with 20–30 degree included angles. The discs were used in pairs on a common arbor with a spacing between them of 1.52 mm to 3.10 mm. Several of these pairs were then rigidly mounted onto a common driven arbor, and mounted on an arbor situated directly above a second arbor, which was carefully aligned to the first. Mounted on this second driven arbor was a precision ground, medium density polymer sleeve, 12.7 cm diameter, which served as a backup to the razor discs. Teflon® polymer sleeves are preferred as Teflon® provides a low coefficient of friction material with excellent run out and compression to accomplish a high quality cut. It has been shown that with both the discs and the sleeve, radial runout needs to be tightly controlled to within 0.003 mm for a high quality cut.

In one embodiment, a pre-label receiver sheet, in the form of a web or continuous roll material was scored by feeding the web material up through the machine and over the top of the lower arbor with sleeve. The top arbor with the razor discs was lowered downward until scratches were noticed on the surface of the material. At this point the discs are just making contact with the material. It was then necessary to lower the discs further, enough to penetrate the face layers and adhesive layer. Care was taken not to penetrate too far into the carrier sheet, which will cause the web material to be completely cut through. As the web material was unwound and fed through the machine, the razor discs cut several distinct zones on the surface of the material. The machine was stopped, and with careful manipulation, the narrow strips were gripped and pulled upwards 45–90 degrees to the material surface. These strips were fed to other rewind spindles for windup, at a suitable tension.

The scoring and stripping process removed narrow strips of pragmatic pre-label sheet and adhesive. The web material is designed in such a way that the adhesive remains attached to the pragmatic pre-label sheet as it is removed and spooled up. The zones where the strips were attached were clear of any pragmatic pre-label sheet or adhesive.

Another preferred slitting technique not shown would be to incorporate a separate scoring and stripping station directly behind the slitter knives. As the web material was scored and stripped, it would pass directly into the slitter knives, which would be precisely aligned to cut the material down the center of the stripped zone. This process would likely be more efficient as problems with web alignment are reduced.

Another slitting technique not shown for producing tack free edges is the use of a cutting die. Utilization of a cutting die to cut the pragmatic pre-label sheet and adhesive allows for a high precision cut of the pragmatic pre-label sheet and adhesive without the need for knives. The cutting die may be a rotary die or a magnetic die attached to rotary cylinder by way of magnets.

Another preferred method of providing a tack free edge is by the use of laser slitting of the pragmatic pre-label sheet. Laser scoring is accomplished by focusing a high power laser beam on to the surface of the pragmatic pre-label sheet to be scored. In this case, the web material is preferably translated under a stationary focused laser beam. The depth of the laser score into the pragmatic pre-label sheet of the invention is critical to the performance of the scoring operation. Insufficient depth of laser score results in incomplete slitting and thus separation of the pragmatic pre-label sheet from the carrier sheet. A laser score than penetrates too far into the carrier sheet results in a loss of bending resistance as the carrier sheet is partially fractured. Depth of laser score is a function of the laser power density per unit area and the translation velocity of the focused spot in relation to the material. The translation of the material or translation of the focused spot can be described as laser energy density per unit area. Laser scoring can be accomplished with either a repetitively pulsed laser or a continuous wave (CW) laser. The pulse rate of the laser should be approximately 1 pulse per second to continuous. The laser optical power should be sufficient to ablate or vaporize the material to be scored when focused with a positive lens. The focal length of the lens preferably is in the range of 3 mm to 500 mm.

The wavelength of the laser should be of a wavelength that is absorptive to the pragmatic pre-label sheet being scored. The preferred wave length for the scoring of the pragmatic pre-label sheet of the invention is between 100 nm to 20,000 nm wavelength. The material should be translated at velocity in which sufficient laser energy to cause ablation is not exceeded. The translated velocity of the web material of the invention preferably is between 1.0 meters/min to 600 meters/min.

The following is an example of a preferred opaque, reflective thermal dye transfer pressure sensitive label structure that has an environmental protection layer (EPL) applied to the outermost thermal dye transfer imaging layer. A bright red tint has been incorporated into the polyethylene layer to provide a bright red background for the thermal dye transfer formed image.

Dye receiving layer with thermal dye transfer formed image
Pragmatic Polymer Sheet
Acrylic pressure sensitive adhesive
Cellulose paper peelable back In one embodiment, the label comprises a dye-receiving layer on both sides of the pragmatic polymer sheet as indicated, for example, below.

| |
|---|
| First Dye Receiving Layer for thermal dye transfer formed image |
| Pragmatic Polymer Sheet |
| Second Dye Receiving Layer for thermal dye transfer formed image |
| Acrylic pressure sensitive adhesive |
| Cellulose paper peelable back |

The image can further comprise fiducial marks. The fiducial marks printed on the label allow for registration of the label during die cutting of the pragmatic sheet and stripping of the pragmatic sheet. The digital thermal dye transfer imaging system disclosed above allows for label images that contain text, graphics and image content to be printed utilizing digital files.

Distributive printing, or a method of printing where image files are printed at several remote locations, allows for label files to be quickly printed and distributed to product labeling lines. This significant reduction in printing cycle time significantly reduces the cost of thermal dye transfer label in that the travel time from the printer to the label line is significantly reduced. Further, the label content can be easily changed as inventory is reduced between label manufacturing and the labeling line.

An example of distributive printing is as follows; label creation performed on a digital work station in one central location after approval is sent to remote printers via the internet. Thermal dye transfer labels are printed in several geographic locations and upon completion of the printing, processing, protecting the image, die cutting and stripping of the matrix, the thermal dye transfer printed labels are sent to product labeling lines. Further, several different digital label files can be sent to the remote printers. The files might contain language differences, geographic image preference and country specific labeling requirements for text.

In another embodiment of the invention, the printing of labels is determined by the consumption of the consumer good being labeled. For example, laser scanning of thermal dye transfer shampoo bottle containing a bar code in the store could detect the number of labels being utilized and by means of an internet connection, feedback to the label printer as to the amount of labels required for the next run of the shampoo labels. Further, by laser scanning the labels, a software program could determine the consumer preference for a label type or image used on the label and that critical information can be feed back through the internet to the remote label printing device to update the label file for a specific consumer preference thereby providing labeling changes based on consumer purchasing patterns.

Dye Donor: A dye-donor element that is used with the thermal dye-receiving label element comprises a support having thereon a dye containing layer. Any dye can be used in the dye-donor employed in the invention provided it is transferable to the dye-receiving layer by the action of heat. Especially good results have been obtained with sublimable dyes such as anthraquinone dyes, e.g., Sumikalon Violet RS® (product of Sumitomo Chemical Co., Ltd.), Dianix Fast Violet 3RFS® (product of Mitsubishi Chemical Industries, Ltd.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumickaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Industries, Ltd.) and Direct Brown M® and Direct Fast Black D® (products of Nippon Kayaku Co. Ltd.); acid dyes such as Kayanol Milling Cyanine 5R® (product of Nippon Kayaku Co. Ltd.); basic dyes such as Sumicacryl Blue 6G® (product of Sumitomo Chemical Co., Ltd.), and Aizen Malachite Green® (product of Hodogaya Chemical Co., Ltd.);

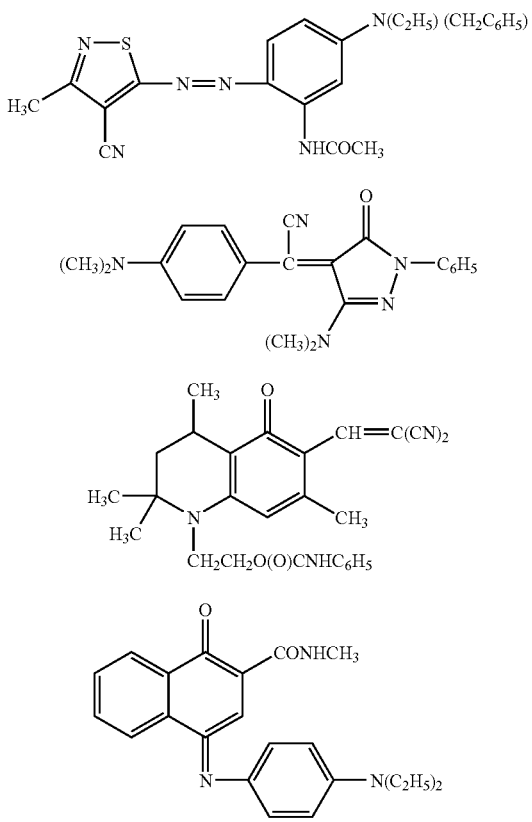

or any of the dyes disclosed in U.S. Pat. No. 4,541,830, the disclosure of which is hereby incorporated by reference. The above dyes may be employed singly or in combination to obtain a monochrome. The dyes may be used at a coverage of from about 0.05 to about 1 g/m2 and are preferably hydrophobic.

The dye in the dye-donor element is dispersed in a polymeric binder such as a cellulose derivative, e.g., cellulose acetate hydrogen phthalate, cellulose acetate, cellulose acetate propionate, cellulose acetate butyrate, cellulose triacetate; a polycarbonate; poly(styrene-co-acrylonitrile), a poly(sulfone) or a poly(phenylene oxide). The binder may be used at a coverage of from about 0.1 to about 5 g/m$^2$.

The dye layer of the dye-donor element may be coated on the support or printed thereon by a printing technique such as a gravure process. The reverse side of the dye-donor element can be coated with a slipping layer to prevent the printing head from sticking to the dye-donor element. Such a slipping layer would comprise a lubricating material such as a surface active agent, a liquid lubricant, a solid lubricant or mixtures thereof, with or without a polymeric binder. Preferred lubricating materials include oils or semi-crystalline organic solids that melt below 100° C. such as poly (vinyl stearate), beeswax, perfluorinated alkyl ester polyethers, poly(caprolactone), carbowax or poly(ethylene glycols). Suitable polymeric binders for the slipping layer include poly(vinyl alcohol-co-butyral), poly(vinyl alcohol-co-acetal), poly(styrene), poly(vinyl acetate), cellulose acetate butyrate, cellulose acetate, or ethyl cellulose.

The amount of the lubricating material to be used in the slipping layer depends largely on the type of lubricating material, but is generally in the range of from about 0.001 to about 2 g/m². If a polymeric binder is employed, the lubricating material is present in the range of 0.1 to 50 wt %, preferably 0.5 to 40, of the polymeric binder employed.

As noted above, the dye-donor elements and pre-label receiver sheets are used to form a dye transfer image. Such a process comprises imagewise-heating a dye-donor element as described above and transferring a dye image to a pre-label receiver sheet to form a dye transfer image for a label.

The dye-donor element may be used in sheet form or in a continuous roll or ribbon. If a continuous roll or ribbon is employed, it may have only one dye thereon or may have alternating areas of different dyes, such as sublimable cyan, magenta, yellow, black, etc., as described in U.S. Pat. No. 4,541,830. Thus, one-, two- three- or four-color elements (or higher numbers also) are included within the scope of the invention.

In a preferred embodiment, the dye-donor element comprises a poly(ethylene terephthalate) support coated with sequential repeating areas of cyan, magenta and yellow dye, and the above process steps are sequentially performed for each color to obtain a three-color dye transfer image. Of course, when the process is only performed for a single color, then a monochrome dye transfer image is obtained.

In a preferred embodiment of the invention, a dye-donor element may be employed which comprises a poly(ethylene terephthalate) support coated with sequential repeating areas of cyan, magenta and yellow dye, and the dye transfer steps are sequentially performed for each color to obtain a three-color dye transfer image. Of course, when the process is only performed for a single color, then a monochrome dye transfer image may be obtained. The dye-donor element may also contain a colorless area which may be transferred to the receiving element to provide a protective overcoat. This protective overcoat may be transferred to the receiving element by heating uniformly at an energy level equivalent to 85% of that used to print maximum image dye density.

A thermal dye transfer assemblage comprises: a) a dye-donor element as described above, and b) a pre-label receiver sheet as described above, the pre-label receiver sheet being in a superposed relationship with the dye-donor element so that the dye layer of the donor element is in contact with the dye image-receiving layer of the receiver element. The above assemblage comprising these two elements may be pre-assembled as an integral unit when a monochrome image is to be obtained. This may be done by temporarily adhering the two elements together at their margins. After transfer, the pre-label receiver sheet is then peeled apart to reveal the dye transfer image.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving label element and the process repeated. The third color is obtained in the same manner.

Thermal printing heads which can be used to transfer dye from dye-donor elements to the label elements of the invention are available commercially. There can be employed, for example, a Fujitsu Thermal Head (FTP040 MCS001), a TDK Thermal Head F415 HH7-1089 or a Rohm Thermal Head KE 2008-F3. Alternatively, other known sources of energy for thermal dye transfer may be used, such as lasers as described in, for example, GB No. 2,083,726A.

EXAMPLES

For the examples below the resin pellets used to extrude the dye receiving layer were formulated by introducing the following components into a Leistritz 27 mm Twin Screw Compounding Extruder heated to 210° C.:

1) Polyester: 157.45 kg (914.46 moles) of cis and trans isomers of cyclohexanedicarboxylic acid, 144.66 kg (457.23 moles) of bisphenol A diethanol, 2.45 kg (18.29 moles) of trimethylolpropane, 66.47 kg (460.89 moles) of cis and trans isomers of cyclohexanedimethanol and 82.51 g of butylstannoic acid catalyst were added to a 150 gallon polyester reactor equipped with a low speed helical agitator. The batch was heated to a final temperature of 275° C. The water byproduct of the esterification reaction began to distill over at 171° C. after about two hours of heat-up. Two hours later at an internal temperature of 267° C., the reactor pressure was ramped down at 10 mm Hg per minute to 3 mm Hg absolute pressure. After two hours under vacuum, the pressure was reduced to 1 mm Hg. After 3 hours and 30 minutes total under vacuum the vacuum was relieved with nitrogen and the very viscous polyester was drained from the reactor onto trays which cooled overnight. The solidified polyester was ground through a ¼" screen. The inherent viscosity in methylene chloride at 0.25% solids was 0.58, the absolute Mw was 102,000, the Mw/Mn was 6.3 and the glass transition temperature by DSC on the second heat was 55.8° C.

2) Polycarbonate (Lexan® 141 from GE Polymers) at 29.2% wt

3) Polyester elastomer with Silicone (MB50-10 from Dow Corning) at 4% wt

4) Dioctyl Sebacate(from Acros Organics) at 2.6% wt.

5) Poly(1,3-butylene glycol adipate) (Admex®429) at 2.6% wt

6) Stabilizer(Weston® 619) at 0.2%

The melted mixture was extruded as a strand into a water bath and then pelletized.

Preparation of Dye-Donor Elements:

The dye-donor used in the example is Kodak Ektatherm ExtraLife® donor ribbon made as follows:

A 4-patch protective layer dye-donor element was prepared by coating on a 6 µm poly(ethylene terephthalate) support:

1) a subbing layer of titanium alkoxide (DuPont Tyzor TBT®) (0.12 g/m2) from a n-propyl acetate and n-butyl alcohol solvent mixture, and 2) a slipping layer containing an aminopropyldimethyl-terminated polydimethylsiloxane, PS513® (United Chemical Technologies, Inc.)(0.01 g/m²), a poly(vinyl acetal) binder, KS-1 (Sekisui Co.) (0.38 g/m2), p-toluenesulfonic acid (0.0003 g/m²), polymethylsilsesquioxane beads 0.5 µm (0.06 g/m²) and candellila wax (0.02 g/m²) coated from a solvent mixture of diethyl ketone and methanol.

On the opposite side of the support was coated:

1) a patch-coated subbing layer of titanium alkoxide (TyzorTBT®) (0.13 g/m²) from a n-propyl acetate and n-butyl alcohol solvent mixture, and 2) repeating yellow, magenta and cyan dye patches containing the compositions as noted below over the subbing layer and a protective patch on the unsubbed portion as identified below.

The yellow composition contained 0.07 g/m² of the first yellow dye illustrated above, 0.09 g/m² of the second yellow dye illustrated above, 0.25 g/m² of CAP48220 (20 s viscosity) cellulose acetate propionate, 0.05 g/m² of Paraplex G-25® plasticizer and 0.004 g/m² divinylbenzene beads (2 μm beads) in a solvent mixture of toluene, methanol and cyclopentanone (66.5/28.5/5).

The magenta composition contained 0.07 g/m² of the first magenta dye illustrated above, 0.14 g/m² of the second magenta dye illustrated above, 0.06 g/m² of the third magenta dye illustrated above, 0.28 g/m² of CAP482-20 (20 s viscosity) cellulose acetate propionate, 0.06 g/m² of Paraplex G-25® plasticizer, 0.05 g/m² of monomeric glass illustrated below, and 0.005 g/m² divinylbenzene beads (2 μm beads) in a solvent mixture of toluene, methanol and cyclopentanone (66.5/28.5/5).

The cyan composition contained 0.10 g/m² of the first cyan dye illustrated above, 0.09 g/m² of the second cyan dye illustrated above, 0.22 g/m² of the third cyan dye illustrated above, 0.23 g/m² of CAP482-20 (20 s viscosity) cellulose acetate propionate, 0.02 g/m² of Paraplex G-25® plasticizer, 0.04 g/m² of monomeric glass illustrated below, and 0.009 g/m² divinylbenzene beads (2 μm beads) in a solvent mixture of toluene, methanol and cyclopentanone (66.5/28.5/5).

The protective patch contained a mixture of poly(vinyl acetal) (0.53 g/m²) (Sekisui KS-10), colloidal silica IPA-ST (Nissan Chemical Co.) (0.39 g/m²) and 0.09 g/m² of divinylbenzene beads (4 μm beads) which was coated from a solvent mixture of diethylketone and isopropyl alcohol (80:20).

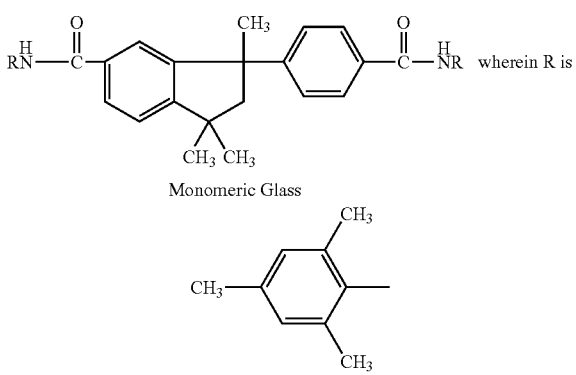

Monomeric Glass

Example 1

This example illustrates the preparation of one embodiment of a pre-label pragmatic sheet of the present invention. A Leistritz 27 mm Twin Screw Compounding Extruder heated to 275° C. was used to mix 1.7 μm beads made from 70 wt % methylmethacrylate crosslinked 30 wt % with divinylbenzene (Tg=160° C.) and a 1:1 blend of poly(ethylene terephthalate)("PET", commercially available as #7352 from Eastman Chemicals) and PETG 6763 polyester copolymer (poly(1,4-cyclohexylene dimethylene terephthalate)) from Eastman Chemicals). All components were metered into the compounder and one pass was sufficient for dispersion of the beads into the polyester matrix. The microbeads were added to attain a 33% by weight loading in the polyester. The compounded material was extruded through a strand die, cooled in a water bath, and pelletized. The pellets were then dried in a desiccant dryer at 65° C. for 12 hours. Then the resin pellets formulated as described above for the extruded dye receiving layer were dried in a desiccant dryer at 50° C. for 12 hours.

Then PET (#7352 from Eastman Chemicals) was dried in a desiccant dryer at 50° C. for 12 hours.

Cast sheets were co-extruded to produce a three layer structure using a 2½" extruder to extrude the PET, layer (3), a 1" extruder to extrude the compounded pellets of polyester and microbeads, layer (2), and a ¾" extruder to extrude the compounded pellets of dye receiving layer, layer 1. Layers 2 and 3 were extruded at 275° C. while layer 1 was extruded at 250° C. The melt streams were fed into a 7 inch multi-manifold die heated at 275° C. As the extruded sheet emerged from the die, it was cast onto a quenching roll set at 55° C. The final dimensions of the continuous cast sheet were 18 cm wide and 480 μm thick. Layer (3) was 310 μm thick while layer (2) was 130 μm thick and layer 1 was 40 μm thick. The cast sheet was then stretched at 110° C. first 3.0 times in the X-direction and then 3.4 times in the Y-direction. The stretched sheet was then Heat Set at 150° C.

The composite film was then converted to a pre-label receiver sheet by laminating a pressure sensitive adhesive and liner to the film. This was done by peeling one of the outside layers of FLEXmount Select DF132311(transfer film manufactured by FLEXcon Corp.) and laminating the exposed adhesive along with the backing film(liner) to the composite film described above. The resulting label media could be printed, dye cut, and applied to a product by first removing the liner and applying the exposed adhesive to said product.

Example 2

This example illustrates the preparation of another embodiment of a pre-label pragmatic sheet of the present invention. A Leistritz 27 mm Twin Screw Compounding Extruder heated to 275° C. was used to mix 1.7 μm beads made from 70 wt % methylmethacrylate crosslinked 30 wt % with divinylbenzene (Tg=160° C.) and a 1:1 blend of poly(ethylene terephthalate)("PET", commercially available as #7352 from Eastman Chemicals) and PETG 6763 polyester copolymer (poly(1,4-cyclohexylene dimethylene terephthalate)) from Eastman Chemicals). All components were metered into the compounder and one pass was sufficient for dispersion of the beads into the polyester matrix. The microbeads were added to attain a 33% by weight loading in the polyester. The compounded material was extruded through a strand die, cooled in a water bath, and pelletized. Then, polyethylene terephthalate (PET #7352 from Eastman Chemicals) was dry blended with Polypropylene ("PP", Huntsman P4G2Z-073AX) at 20% weight based on the total weight of the blend. This blend was then further blended with the aforementioned PMMA/polyester pellets at a 1:1 weight ratio. This final blend was dried in a desiccant dryer at 65° C. for 12 hours.

As the material for layer 3, PET (#7352 from Eastman Chemicals) was dry blended with polypropylene("PP", Huntsman P4G2Z-073AX) at 20% weight and dried in a desiccant dryer at 65° C. for 12 hours. Then the resin pellets formulated as described above for the extruded dye receiving layer were dried in a desiccant dryer at 50° C. for 12 hours.

Cast sheets were co-extruded to produce a three layer structure using a 2½" extruder to extrude the PET/PP blend, layer (3), a 1" extruder to extrude the compounded pellets of polyester and microbeads blended with the PET/PP blend, layer (2), and a ¾" extruder to extrude the compounded pellets of dye receiving layer, layer 1. Layers 2 and 3 were extruded at 275° C. while layer 1 was extruded at 250° C. The melt streams were fed into a 7 inch multi-manifold die also heated at 275° C. As the extruded sheet emerged from the die, it was cast onto a quenching roll set at 55° C. The PP in the PET matrix of layer (3) dispersed into globules between 10 and 30 μm in size during extrusion. The final dimensions of the continuous cast sheet were 18 cm wide and 480 μm thick. Layer (3) was 350 μm thick while layer (2) was 130 μm thick. The cast sheet was then stretched at 110° C. first 3.0 times in the X-direction and then 3.4 times in the Y-direction. The stretched sheet was then Heat Set at 150° C.

The composite film can be, as in Example 1, converted to a pre-label receiver sheet by laminating a pressure sensitive adhesive and liner to the film. This can be done by peeling one of the outside layers of FLEXmount Select DF132311 (transfer film manufactured by FLEXcon Corp.) and laminating the exposed adhesive along with the backing film (liner) to the composite film described above. The resulting label media can be printed, dye cut, and applied to a product by first removing the liner and applying the exposed adhesive to said product.

Example 3

This example illustrates the preparation of another embodiment of a pre-label pragmatic sheet of the present invention. A Leistritz 27 mm Twin Screw Compounding Extruder heated to 275° C. was used to mix 1.7 μm beads made from 70 wt % methylmethacrylate crosslinked 30 wt % with divinylbenzene (Tg=160° C.) and a 1:1 blend of poly(ethylene terephthalate)("PET", commercially available as #7352 from Eastman Chemicals) and PETG 6763 polyester copolymer (poly(1,4-cyclohexylene dimethylene terephthalate)) from Eastman Chemicals). All components were metered into the compounder and one pass was sufficient for dispersion of the beads into the polyester matrix. The microbeads were added to attain a 33% by weight loading in the polyester. The compounded material was extruded through a strand die, cooled in a water bath, and pelletized. Then, polyethylene terephthalate (PET #7352 from Eastman Chemicals) was dry blended with Polypropylene ("PP", Huntsman P4G2Z-073AX) at 20% weight based on the total weight of the blend. This blend was then further blended with the aforementioned PMMA/polyester pellets at a 1:1 weight ratio. This final blend was dried in a desiccant dryer at 65° C. for 12 hours.

Then the resin pellets formulated as described above for the extruded dye receiving layer were dried in a desiccant dryer at 50° C. for 12 hours.

Cast sheets were co-extruded to produce a two layer structure using a 1" extruder to extrude the compounded pellets of polyester and microbeads blended with the PET/PP blend, layer (2), and a ¾" extruder to extrude the compounded pellets of dye receiving layer, layer 1. Layer 2 was extruded at 275° C. while layer 1 was extruded at 250° C. The melt streams were fed into a 7 inch multi-manifold die also heated at 275° C. As the extruded sheet emerged from the die, it was cast onto a quenching roll set at 55° C. The final dimensions of the continuous cast sheet were 18 cm wide and 480 μm thick. Layer (2) was 480 μm thick. The cast sheet was then stretched at 110° C. first 3.0 times in the X-direction and then 3.4 times in the Y-direction. The stretched sheet was then Heat Set at 150° C.

The composite film can be, as in Example 1, converted to a pre-label receiver sheet by laminating a pressure sensitive adhesive and liner to the film. This can be done by peeling one of the outside layers of FLEXmount Select DF132311 (transfer film manufactured by FLEXcon) and laminating the exposed adhesive along with the backing film(liner) to the composite film described above. The resulting label media can be printed, dye cut, and applied to a product by first removing the liner and applying the exposed adhesive to said product.

Example 4

This Example illustrates the dye-transfer printing efficiency/quality of thermal dye-transfer pre-label receiver sheet according to the present invention. An eleven-step sensitometric full color image was prepared from the above dye-donor and dye-receiver(pre-label receiver sheet) of Example 1 by printing the donor-receiver assemblage in a Kodak® 8650 Thermal Printer. The dye-donor element was placed in contact with the polymeric receiving layer side of the pre-label receiver sheet. The assemblage was positioned on an 18 mm platen roller and a TDK LV5406A thermal head with a head load of 6.35 Kg was pressed against the platen roller. The TDK LV5406A thermal print head has 2560 independently addressable heaters with a resolution of 300 dots/inch and an average resistance of 3314Ω. The imaging electronics were activated when an initial print head temperature of 36.4° C. had been reached. The assemblage was drawn between the printing head and platen roller at 16.9 mm/sec. Coincidentally, the resistive elements in the thermal print head were pulsed on for 58 μsec every 76 μsec. Printing maximum density required 64 pulses "on" time per printed line of 5.0 msec. The voltage supplied at 13.6 volts resulted in an instantaneous peak power of approximately $58.18 \times 10^{-3}$ Watt/dot and the maximum total energy required to print Dmax was 0.216 mJoules/dot. This printing process heated the laminate uniformly with the thermal head to permanently adhere the laminate to the print. The donor support was peeled away as the printer advanced through its heating cycle, leaving the laminate adhered to the imaged pre-label receiver sheet.

The printed pre-label receiver sheet of example 2 had very good image quality and was free of any grainy appearance.

The invention has been described in detail with particular reference to certain preferred embodiments thereof, but it will be understood that variations and modifications can be effected within the spirit and scope of the invention.

What is claimed is:

1. A process for making a pre-label receiver sheet comprising a pragmatic pre-label sheet and a carrier sheet, which pragmatic pre-label sheet comprises, in order, a polymeric image-receiving layer, a pragmatic polymer sheet, and an adhesive layer, which process comprises the following steps:
   (a) providing a pragmatic pre-label sheet by the following steps:
      (i) co-extruding a first melt for a polymeric image-receiving layer with one or more other melts for forming a single-layer or multiple-layer pragmatic polymer sheet, wherein said one or more other melts includes a second melt comprising an orientable thermoplastic polymeric material for forming a microvoided layer comprising a void initiator, thereby forming a co-extruded cast composite film comprising at least said image-receiving layer and said microvoided layer;

(ii) stretching in at least one direction said cast composite film to reduce the thickness of the layers in the composite film and to produce an oriented composite film, wherein the image receiving layer is less than 15 micrometers thick; and (iii) optionally applying an intermediate sheet, comprising one or more layers, to a back surface of the oriented composite film;

(iv) applying a pressure-sensitive adhesive layer, or a laminate comprising a pressure-sensitive adhesive layer, to at least a portion of the back surface of the oriented composite film, on a side opposite the image-receiving layer or, when an intermediate sheet is present, to at least a portion of a back surface of the intermediate sheet, to form the pragmatic pre-label sheet; and (b) providing the pragmatic pre-label sheet with a carrier sheet such that the adhesive layer of the pragmatic pre-label sheet is releasably covered with the carrier sheet in peelable adhesion, thereby forming an integral-separable pre-label receiver sheet.

2. The process of claim 1 wherein the carrier sheet is laminated to the pragmatic pre-label sheet so that a front surface of the carrier sheet faces the adhesive layer of the pragmatic pre-label sheet.

3. The process of claim 1 wherein at least one pragmatic-label portion is formed in the pragmatic pre-label sheet by cutting a shape through the pragmatic pre-label sheet but not through the carrier sheet.

4. The process of claim 1 wherein the microvoided layer comprises a polyester material.

5. The process of claim 1 wherein the microvoided layer and the image-receiving layer both comprise a polyester material.

6. The process of claim 1 wherein the pragmatic polymer sheet further comprises a coextruded second layer in addition to the microvoided layer, said microvoided layer having a top side and bottom side, wherein the coextruded second layer is on the bottom side of the microvoided layer and the image-receiving layer is on the top side of the microvoided layer.

7. The process of claim 1 wherein the pragmatic pre-label sheet consists essentially of only coextruded biaxially stretched layers above the pressure-sensitive adhesive layer.

8. The process of claim 1 wherein the pragmatic pre-label sheet consists essentially of the image-receiving layer and the pragmatic polymer sheet.

9. The process of claim 1 wherein the pressure-sensitive adhesive layer is coated onto a peelable carrier to form a pressure-sensitive adhesive transfer sheet, wherein the transfer sheet is laminated to the back surface of the oriented composite film such that steps (a)(iv) and (b) occur simultaneously.

10. The process of claim 1 wherein the carrier sheet comprises more than one layer and the layers of the carrier sheet are applied to the pre-label receiver sheet in more than one step.

11. The process of claim 1 wherein the pre-label sheet is imaged with a thermal dye transfer process including the printing of fiducial marks with a density of greater than 0.5.

12. The process of claim 1 wherein said peelable carrier has a stiffness of between 15 and 60 millinewtons.

13. The process of claim 1 where the integral-separable pre-label reciever sheet comprises a plurality of pragmatic-label portions and cutting lines are formed around and through each pragmatic-label portion but substantially not in or through the carrier sheet.

14. The process of claim 13, wherein the plurality pragmatic-label portions are formed by sectioning the sheet into a plurality of frames each forming a separable pragmatic label.

15. The process of claim 1 wherein at least one dye image is formed on the image-receiving layer.

16. The process of claim 15 wherein the at least one dye image is a thermally transferred image formed in said receiving layer by transferring a dye from a colorant layer of a thermal dye-donor element or heat transfer sheet.

17. The process of claim 16 wherein the at least one dye image has a print density of at least 1.5.

18. The process of claim 17 wherein the at least one dye image has a print density of the image is at least 2.0.

19. The process of claim 1 wherein the microvoided layer comprises a continuous phase polyester matrix having dispersed therein void initiators selected from the group consisting of crosslinked organic microbeads, inorganic particles, non-crosslinked polymer particles that are immiscible with the polyester matrix, and combinations thereof, said microvoided layer having a void volume of at least 25% by volume.

20. The process of claim 1 wherein the microvoided layer comprises a continuous phase polyester matrix having dispersed therein a mixture of crosslinked organic microbeads and non-crosslinked polymer particles that are immiscible with the polyester matrix, said layer having a void volume of at least 25% by volume.

21. The process of claim 1 wherein the microvoided layer comprises crosslinked organic microbeads that are dispersed in a continuous phase polyester matrix, said layer having a void volume formed by said microbeads of at least 25% by volume.

22. The process of claim 20 or 21 wherein the pragmatic polymer sheet further comprises a coextruded third layer comprised of a voided or non-voided material.

23. The process of claim 22 wherein the coextruded third layer comprises polyester.

24. The process of claim 21 wherein the microvoided layer comprises a continuous phase polyester matrix having dispersed therein substantially only crosslinked polymer microbeads.

25. The process of claim 20 or 21 wherein the pragmatic polymer sheet further comprises a coextruded third layer comprised of a non-voided polyester.

26. The process of claim 20 or 21 wherein the microvoided layer has a void volume of from 25 to 65 volume %.

27. The process of claim 20 or 21 wherein said continuous phase polyester matrix of said microvoided layer comprises polyethylene(terephthalate) or a copolymer thereof.

28. The process of claim 20 or 21 wherein said continuous phase polyester matrix of said microvoided layer comprises a blend comprising polyethylene(terephthalate) and poly(1, 4-cyclohexylene dimethylene terephthalate).

29. The process of claim 20 or 21 wherein said crosslinked organic microbeads comprise a polymer comprising a monomeric unit formed by at least one of styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, arylamidomethylpropane sulfonic acid, vinyl toluene, and trimethylol propane triacrylate.

30. The process of claim 29 wherein said crosslinked organic microbeads comprise a poly(methyl methacrylate) or poly(butyl acrylate) polymer.

31. The process of claim 20 wherein said non-crosslinked polymer particles that are immiscible with said polyester matrix have an olefinic backbone.

32. The process of claim 31 wherein said non-crosslinked polymer particles that are immiscible with said polyester matrix comprise polymers derived from a monomer selected from propylene and/or ethylene.

33. A process for making a label sheet comprising a pragmatic label sheet and a carrier sheet, which pragmatic label sheet comprises, in order, an imaged polymeric image-receiving layer, a pragmatic polymer sheet, and an adhesive layer, which process comprises the following steps:
  (a) providing a pragmatic label sheet by the following steps:
    (i) co-extruding a first melt for a polymeric image-receiving layer with one or more other melts for forming a single-layer or multiple-layer pragmatic polymer sheet, wherein said one or more other melts includes a second melt comprising an orientable thermoplastic polymeric material for forming a microvoided layer comprising a void initiator, thereby forming a co-extruded cast composite film comprising at least said image-receiving layer and said microvoided layer;
    (ii) stretching in at least one direction said cast composite film to reduce the thickness of the layers in the composite film and to produce an oriented composite film, wherein the image receiving layer is less than 15 micrometers thick; and
    (iii) optionally applying an intermediate sheet, comprising one or more layers, to a back surface of the oriented composite film;
    (iv) applying a pressure-sensitive adhesive layer, or a laminate comprising a pressure-sensitive adhesive layer, to at least a portion of the back surface of the oriented composite film, on a side opposite the image-receiving layer or, when an intermediate sheet is present, to at least a portion of a back surface of the intermediate sheet, to form a pragmatic label sheet;
  (b) providing the pragmatic laber receiver sheet with a carrier sheet such that the adhesive layer of the pragmatic label receiver sheet is releasably covered with the carrier sheet in peelable adhesion, thereby forming an integral-separable pre-label receiver sheet;
  (c) imagewise thermally transferring dyes to form at least one image in the image-receiving layer; and
  (d) cutting at least one shape into at least the pre-label receiver sheet to form at least one pragmatic label comprising a thermal-dye-transfer image, thereby forming an integral-separable label sheet comprising the pragmatic label sheet attached to the carrier sheet.

34. The process of claim 33 wherein in step (d), cutting lines are formed at least partially through the integral-separable pre-label receiver sheet, so to allow peeling of at least one pragmatic label comprising at least a portion of the (a) imaged image-receiving layer, (b) substrate, and (c) pressure-sensitive adhesive layer, wherein the substrate comprises all the layers, including the (i) pragmatic polymer sheet and (ii) optional intermediate sheet, between the image-receiving layer and the pressure-sensitive layer.

35. The process of claim 1 or 33 wherein said microvoided layer has a density of less than 0.95 grams/cc.

36. The process of claim 35 wherein said microvoided layer has a density of from 0.4 to 0.90 grams/cc.

37. The process of claim 1 or 33 wherein the total thickness of said microvoided layer, after stretching, is from 20 to 150 micrometers.

38. The process of claim 1 or 33 wherein said image-receiving layer comprises a polymeric binder containing a polyester and/or polycarbonate.

39. The process of claim 38 wherein a blend of polyester and polycarbonate is present in the image-receiving layer in a weight ratio of 90:10 to 10:90.

40. The process of claim 20 wherein the ratio of the volume of crosslinked organic microbeads to the volume of said non-crosslinked polymer particles that are immiscible with said polyester matrix is from 4:1 to 1:4.

41. The process of claim 33 wherein the at least one shape further comprises exposed edges having a width of less than 20 mm.

42. The process of claim 33 further comprising removing said carrier and applying said pragmatic label to a package or container.

43. A process for making a integral-separable pre-label receiver sheet, comprising a pragmatic pre-label sheet and a carrier sheet, which pragmatic pre-label sheet comprises, in order, a polymeric image-receiving layer, a pragmatic polymer sheet, and an adhesive layer, which process comprises the following steps:
  (a) providing a pragmatic pre-label sheet by the following steps:
    (i) co-extruding a first melt for a polymeric image-receiving layer with at least two other melts for forming a multiple-layer pragmatic polymer sheet, wherein said at least two other melts includes a second melt comprising a continuous phase polymer matrix having dispersed therein crosslinked organic microbeads and optionally non-crosslinked polymer particles, and a third melt comprising a voided or non-voided thermoplastic material, thereby forming a coextruded cast composite film comprising at least said three layers, the image-receiving layer, the microvoided layer and the voided or non-voided thermoplastic material layer;
    (ii) stretching in at least one direction said cast composite film to reduce the thickness of the layers in the composite film and to produce an oriented composite film comprising as the first layer the image-receiving layer, as the second layer the microvoided layer, and as a third layer the voided or non-voided thermoplastic material layer, wherein the image receiving layer is less than 15 micrometers thick; and
    (iii) optionally applying an intermediate sheet, comprising one or more layers, to a back surface of the oriented composite film;
    (iv) applying a pressure-sensitive adhesive layer, or a laminate comprising a pressure-sensitive adhesive layer, to at least a portion of the back surface of the oriented composite film, on a side opposite the image-receiving layer or, when an intermediate sheet is present, to at least a portion of the back surface of the intermediate sheet, to form a pragmatic pre-label sheet; and
  (b) providing the pragmatic pre-label sheet with a carrier sheet such that the adhesive layer of the pragmatic pre-label sheet is releasably covered with the carrier sheet in peelable adhesion, thereby forming an integral-separable pre-label receiver sheet.

44. The process of claim 43 wherein in step a(i) the second melt comprises the continuous phase polymer matrix having dispersed therein crosslinked organic microbeads and non-crosslinked polymer particles that are immiscible with the polyester matrix.

* * * * *

UNITED STATES PATENT AND TRADEMARK OFFICE
CERTIFICATE OF CORRECTION

PATENT NO. : 7,189,299 B2  
APPLICATION NO. : 10/602839  
DATED : March 13, 2007  
INVENTOR(S) : Thomas M. Laney et al.

It is certified that error appears in the above-identified patent and that said Letters Patent is hereby corrected as shown below:

| | |
|---|---|
| Column 37, Line 67 | In Claim 13, delete "reciever" and insert -- receiver --, therefor. |
| Column 38, Line 4 | In Claim 14, after "plurality" insert -- of --. |
| Column 39, Line 40 | In Claim 33, delete "laber receiver" and insert -- label --, therefor. |
| Column 39, Line 42 | In Claim 33, after "label" delete "receiver". |

Signed and Sealed this

Fifth Day of January, 2010

David J. Kappos  
*Director of the United States Patent and Trademark Office*